US012687055B2

(12) United States Patent
McDaniel

(10) Patent No.: US 12,687,055 B2
(45) Date of Patent: Jul. 21, 2026

(54) SYSTEMS AND METHODS FOR LIMITING ACCESS TO DOMESTIC FOOD STORAGE

(71) Applicant: Elliot MacGyver McDaniel, Joint Base Lewis-McChord, WA (US)

(72) Inventor: Elliot MacGyver McDaniel, Joint Base Lewis-McChord, WA (US)

(73) Assignee: Elliot MacGyver McDaniel, Joint Base Lewis-McChord, WA (US)

( * ) Notice: Subject to any disclaimer, the term of this patent is extended or adjusted under 35 U.S.C. 154(b) by 146 days.

(21) Appl. No.: 18/404,754

(22) Filed: Jan. 4, 2024

(65) Prior Publication Data

US 2025/0223851 A1 Jul. 10, 2025

(51) Int. Cl.

*E05C 3/12* (2006.01)
*E05C 19/12* (2006.01)
*E05C 19/16* (2006.01)

(52) U.S. Cl.

CPC ................ *E05C 3/12* (2013.01); *E05C 19/12* (2013.01); *E05C 19/16* (2013.01)

(58) Field of Classification Search

CPC ... E05C 3/00; E05C 3/008; E05C 3/12; E05C 3/14; E05C 3/16; E05C 3/30; E05C 7/00; E05C 7/005; E05C 19/12; E05C 19/16

See application file for complete search history.

(56) References Cited

U.S. PATENT DOCUMENTS

| | | | | |
|---|---|---|---|---|
| 2007/0138806 A1* | 6/2007 | Ligtenberg | G06F 1/1616 | |
| | | | 292/251.5 | |
| 2017/0159683 A1* | 6/2017 | Fiedler | E05C 1/14 | |

FOREIGN PATENT DOCUMENTS

| | | | | |
|---|---|---|---|---|
| DE | 102013102319 A1 * | 9/2014 | E05C 3/14 | |
| GB | 2440025 A * | 1/2008 | E05B 47/0046 | |

OTHER PUBLICATIONS

Numbered paragraphs version of GB 2440025 A (Year: 2008).*
Machine translation for DE 102013102319 A1 (Year: 2014).*

* cited by examiner

*Primary Examiner* — Christine M Mills
*Assistant Examiner* — Christopher F Callahan
(74) *Attorney, Agent, or Firm* — Davis Wright Tremaine LLP

(57) ABSTRACT

Methods and systems are provided for limiting access to food storage and other storage compartments. In one example, a system may include first and second coupling elements which may be reversibly engageable with one another, wherein, to engage the first and second coupling elements, the first and second coupling elements may be mechanically and magnetically coupled to one another, and wherein, upon disengagement of the first and second coupling elements, a fastener of the second coupling element may be rotated away from a fastener of the first coupling element such that the first and second coupling elements may no longer be mechanically and magnetically coupled to one another. In certain examples, an interior of a storage compartment may not be accessible when the first and second coupling elements are engaged and the interior of the storage compartment may be accessible when the first and second coupling elements are disengaged.

20 Claims, 17 Drawing Sheets

SYSTEMS AND METHODS FOR LIMITING ACCESS TO DOMESTIC FOOD STORAGE

FIELD

Embodiments of the subject matter disclosed herein relate to locking systems and apparatuses for preventing, limiting, or otherwise restricting access to storage compartments and methods for using such systems and apparatuses, and more particularly to locking systems and apparatuses for child-proofing household food storage compartments, such as refrigerators, freezers, and the like.

BACKGROUND

Limiting child access to food and beverage items in a household is a common challenge for parents and guardians. Though food storage compartments may be locked, this may prove problematic for a parent or guardian who installed the lock as it may be desirable to maintain access to the locked food storage compartments for older children and other adults. It may be advantageous for a locking mechanism which prevents younger children from accessing food storage compartments to remain easily and/or quickly unlockable by adults and older children.

BRIEF DESCRIPTION OF THE DRAWINGS

Various embodiments and techniques will be described with reference to the drawings, in which.

DETAILED DESCRIPTION

Figure 1A:
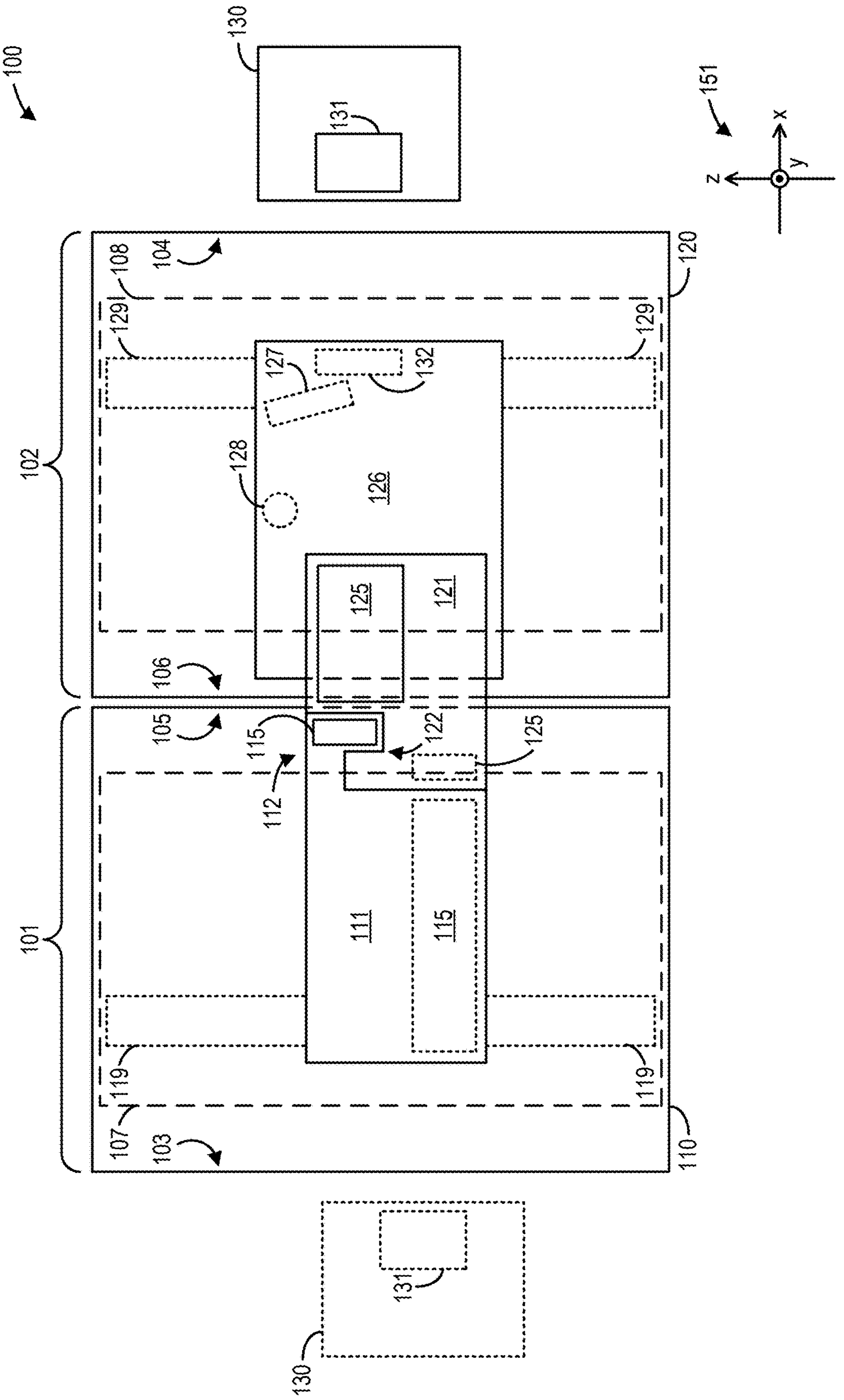
FIG. 1A shows a simplified plan view of a childproof locking system including first and second coupling elements and a key, the childproof locking system being in a first state in which a first fastener of the first coupling element is mechanically and magnetically engaged to a second fastener of the second coupling element via respective mechanical and magnetic locking mechanisms, in accordance with at least one embodiment.

Techniques described and suggested herein include at least one embodiment of an apparatus, including: a first locking element; a second locking element reversibly engageable with the first locking element; a first enclosure housing the first locking element; and a second enclosure housing the second locking element, the second locking element movable within the second enclosure, wherein, to engage the first and second locking elements, the second locking element may be compelled by a magnetic force to extend outwardly from an opening of the second enclosure and into an opening of the first enclosure to engage with the first locking element, and wherein, upon disengagement of the first and second locking elements, the second locking element may be retracted within the second enclosure and rotated away from the first locking element.

In at least one embodiment, a system for limiting access to an interior of a storage compartment may include: a first coupling element including a first outer shell and a first fastener housed within the first outer shell; and a second coupling element including a second outer shell and a second fastener housed within the second outer shell, wherein the system may be adjusted from a third state to a first state upon mechanically and magnetically engaging the first and second fasteners, and wherein the system may be adjusted from the first state to the third state upon overcoming mechanical and magnetic engagement of the first and second fasteners by displacing either the first fastener or the second fastener and then rotating the second fastener away from the first fastener. In at least one embodiment, the system may be adjusted to a second (e.g., intermediate) state from either the first state or the third state, wherein the second fastener may be disengaged from the first fastener while at least partially extending into the first outer shell (e.g., not fully retracted into the second outer shell).

In at least one embodiment, method for locking and unlocking a storage compartment may include: attaching, to a first surface, a first casing at least partially enclosing a first mating element; attaching, to a second surface, a second casing at least partially enclosing a second mating element, the second casing attached to the second surface so as to be aligned with the first casing; closing the storage compartment by bringing the first and second surfaces together, whereby the second mating element may engage with the first mating element via each of a mechanical locking mechanism and a magnetic locking mechanism; disengaging each of the mechanical and magnetic locking mechanisms by increasing a displacement between the first and second mating elements and then rotating the second mating element away from the first mating element; and while maintaining each of the mechanical and magnetic locking mechanisms disengaged, opening the storage compartment by separating the first and second surfaces.

These, as well as other aspects, advantages, and alternatives will become apparent to those of ordinary skill in the art by reading the following detailed description, with reference where appropriate to the accompanying drawings. Further, it should be understood that descriptions and figures provided herein are intended to illustrate the invention by way of example only and, as such, that numerous variations are possible.

For example, the following description relates to various embodiments of systems and methods for childproofing refrigerators, freezers, and other food storage compartments present in a domestic residence or other shared residential, educational, or recreational space. As used herein, "childproof" or "childproofing" may refer to prevent, limit, or otherwise restrict access to one or more storage compartments based, at least in part, on an age of a person attempting to gain access to the one or more storage compartments. For instance, it may desirable for parents or guardians of younger children (e.g., less than 10 years old, or less than 5 years old), and, in certain cases, older children (e.g., 10 years old or older, or 5 years old or older), to prevent, limit, or otherwise restrict access to food storage compartments. Affixing key or combination locks to doors or lids of food storage compartments may effectively prevent access for any individual who does not possess a corresponding key or combination code. However, such locks also prevent access to adults who do not possess the corresponding key or combination code, such as adults who are not apprised of, misplace, or forget the corresponding key or combination code.

Accordingly, it may instead be desirable to prevent, limit, or otherwise restrict access to food storage compartments based on a commonality shared among most younger children, but not among most adults and older children. As an example, embodiments of locking devices described herein may not be unlockable by any individual who does not possess a threshold level of cognitive reasoning or motor skills. In some embodiments, a locking device may be unlockable via application of a threshold level of physical strength and thus may remain locked to individuals unable to apply sufficient physical strength. In additional or alternative embodiments, the locking device may unlock when a sequence of mechanical actuations are applied in a predetermined order and the locking device may not unlock when the predetermined order is deviated from, e.g., by an individual who does not know and/or is unable to deduce the predetermined order. In additional or alternative embodiments, the locking device may unlock responsive to use of a key which is not specific to the locking device. For instance, the key may be a magnetic key. If the magnetic key is misplaced or not possessed by an individual, another magnet or magnetic material could instead be utilized to unlock the locking device. It may also be desirable that a mechanism by which the locking device unlocks is relatively quick and easy to perform. Certain embodiments of the locking device may accordingly have at least one facile mechanism (e.g., not requiring a unique key and/or utilizing relatively little physical strength) by which the locking device unlocks, such as a magnetic key unlocking the locking device via a linear sliding motion. In certain embodiments, the locking device may be unlockable via any one of a plurality of mechanisms. As an example, the locking device may be unlockable via the key, as well as application of the threshold level of physical strength and/or the sequence of mechanical actuations. Accordingly, in such an example, if the key is misplaced, the locking device may be unlocked via an alternative mechanism. The alternative mechanism may be similarly facile to a key-based mechanism or may instead be more difficult so as to function as a failsafe for childproofing the locking device (e.g., young children may be prevented from using the key-based mechanism by not having access to the key and may be prevented from using the alternative mechanism by lacking sufficient physical strength and/or cognitive abilities to actuate the alternative mechanism).

Figure 1B:
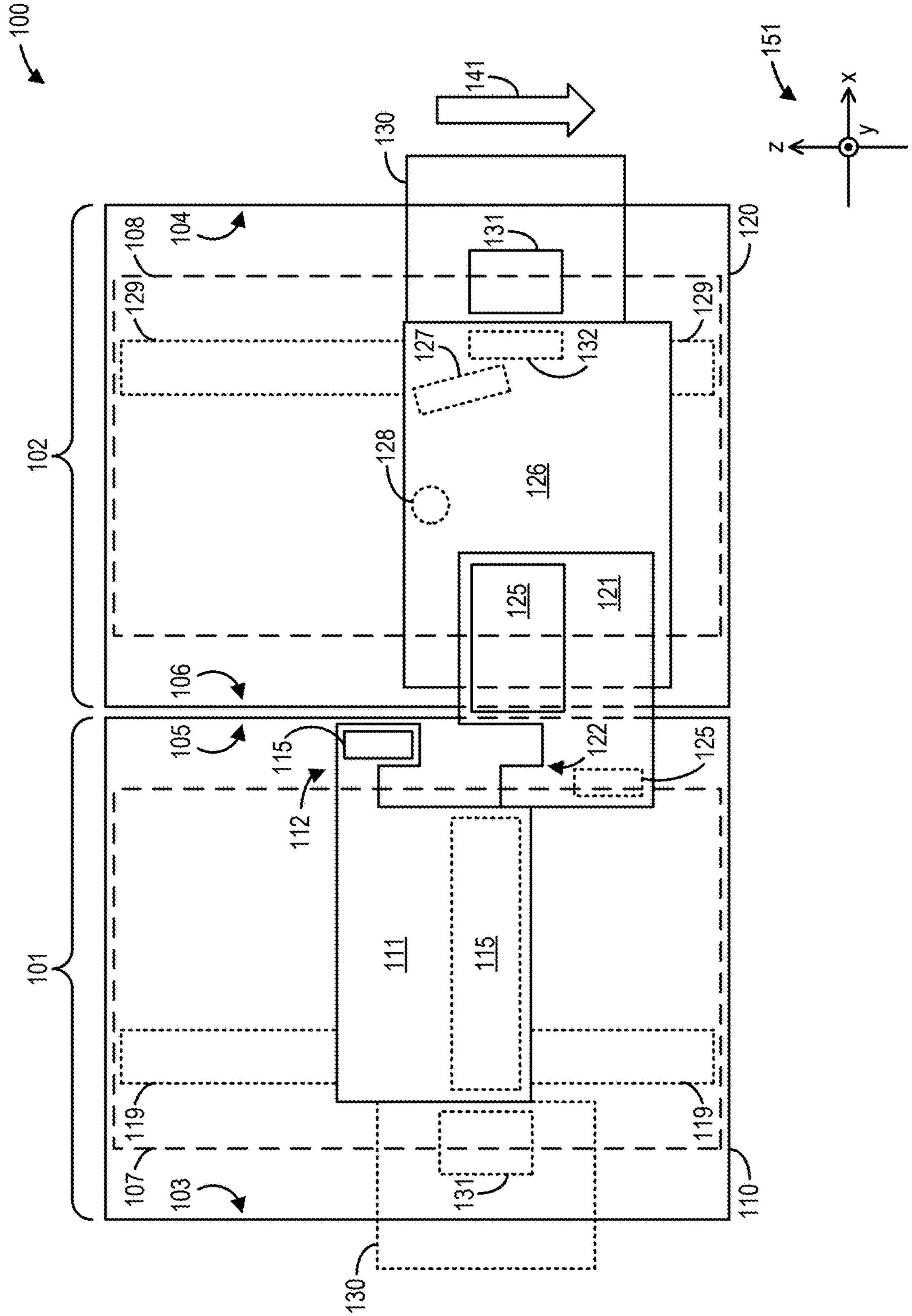
FIG. 1B shows a simplified plan view of the childproof locking system of FIG. 1A in a second state in which the first fastener of the first coupling element is disengaged from the second fastener of the second coupling element, wherein the childproof locking system may be adjusted from the first state to the second state by engaging the key with the second coupling element and sliding the key so as to disengage the mechanical and magnetic locking mechanisms, in accordance with at least one embodiment.
Figure 1C:
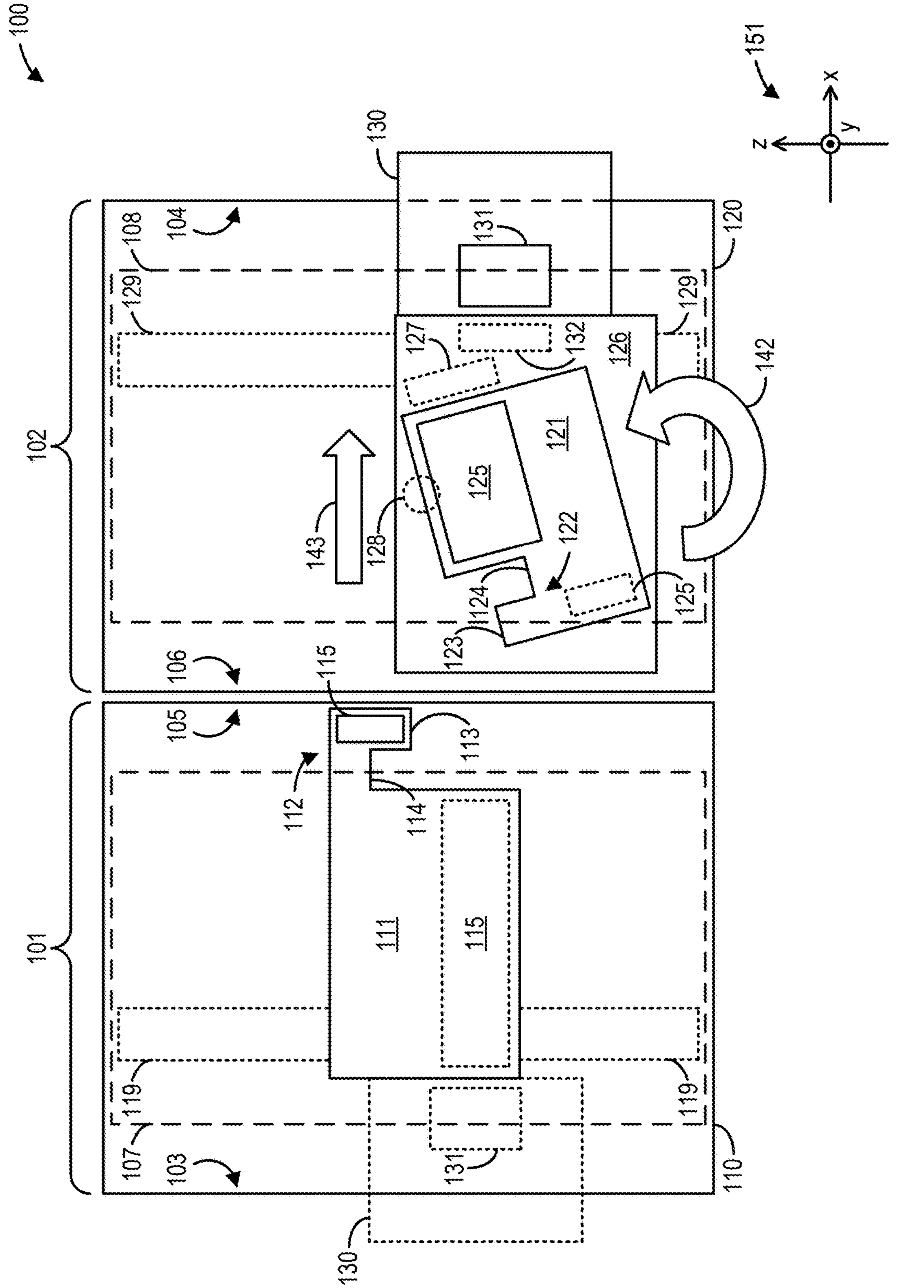
FIG. 1C shows a simplified plan view of the childproof locking system of FIG. 1A in a third state in which the first coupling element is decoupled from the second coupling element, wherein the childproof locking system may be adjusted from the second state to the third state by retracting the second fastener of the second coupling element into an outer shell of the second coupling element, in accordance with at least one embodiment.

Referring now to FIGS. 1A-1C, simplified plan views of a childproof locking system 100 including first and second coupling elements 101, 102 are shown, where FIG. 1A depicts the childproof locking system 100 in a first state, FIG. 1B depicts the childproof locking system 100 in a second state, and FIG. 1C depicts the childproof locking system 100 in a third state. As shown in FIG. 1A, in the first state, a first fastener 111 of the first coupling element 101 may be engaged with a second fastener 121 of the second coupling element 102. As shown in FIG. 1B, in the second state, the first fastener 111 may be disengaged from the second fastener 121. The first and second fasteners 111, 121 may be reversibly engageable (e.g., capable of being repeatedly engaged and disengaged during a lifetime use of the childproof locking system 100) with one another such that the childproof locking system 100 may be adjusted from the first state to the second state and vice versa, e.g., so as to limit access to an interior of a storage compartment. As shown in FIG. 1C, in the third state, the first coupling element 101 may be decoupled (e.g., physically separated) from the second coupling element 102. When the childproof locking system 100 is adjusted from the second state to the third state, the second fastener 121 may be rotated away from the first fastener 111 such that no portion of the second coupling element 102 may be within a volume delimited by the first coupling element 101. FIGS. 2A-7 depict examples of childproof locking systems which are configurable in such states and/or other states. For example, FIGS. 2A, 3A, 4, 5A, 6A, and 7 each depicts an example of a childproof locking system in a state in which first and second fasteners are engaged, FIGS. 3B, 5B, and 6B each depicts an example of a childproof locking system in a state in which the first and second fasteners are disengaged, and FIGS. 2B, 3C, 5C, and 6C each depicts an example of a childproof locking system in a state in which first and second coupling elements respectively housing the first and second fasteners are decoupled. An exemplary method for locking a storage compartment by engaging first and second fasteners of a childproof locking system, such as the childproof locking system 100, and unlocking the storage compartment by disengaging the first and second fasteners is discussed in detail below with reference to FIG. 8.

In some embodiments, the first fastener 111 may be mechanically engageable with the second fastener 121 via a mechanical locking mechanism. In an example embodiment, the mechanical locking mechanism may include, on the first fastener 111, a first hook 112 and, on the second fastener 121, a second hook 122, where mechanical engagement of the first and second fasteners 111, 121 may include a tip 113 of the first hook 112 being seated in a bend 124 of the second hook 122 and a tip 123 of the second hook 122 being seated in a bend 114 of the first hook 112. In additional or alternative embodiments, the first fastener 111 may be magnetically engageable with the second fastener 121 via a magnetic locking mechanism. In an example embodiment, the magnetic locking mechanism may include, on the first fastener 111, a first ferromagnetic material 115 and, on the second fastener 121, a second ferromagnetic material 125, where magnetic engagement of the first and second ferromagnetic materials 115, 125 may include a magnetic force induced by magnetic attraction of the first and second ferromagnetic materials 115, 125 to one another maintaining the first and second ferromagnetic materials 115, 125 in magnetic alignment with one another. In certain embodiments, the childproof locking system 100 may be adjusted or otherwise transitioned from the first state to the second state by disengaging the mechanical and magnetic locking mechanisms (e.g., by overcoming mechanical and magnetic engagement of the first and second fasteners 111, 121).

In some embodiments, when the first and second fasteners 111, 121 are (mechanically and magnetically) disengaged, the second fastener 121 may be retracted into a second outer shell 120 of the second coupling element 102 (e.g., fully retracted into the second outer shell 120, such that no portion of the second fastener 121 may extend from the second coupling element 102) while the first fastener 111 may be maintained in position within a first outer shell 110 of the first coupling element 101. In an example embodiment, the second fastener 121, or a carrier 126 housing the second fastener 121 within the second coupling element 102, may pivot, swing, or otherwise rotate away from the first coupling element 101 (e.g., via gravity) such that the second fastener 121 may be retracted within the second outer shell 120. In certain embodiments, the childproof locking system 100 may be adjusted or otherwise transitioned from the second state to the third state by retracting the second fastener 121 into the second outer shell 120 such that the first and second coupling elements 101, 102 may be decoupled from one another.

A set of Cartesian coordinate axes 151 is shown in FIGS. 1A-1C for contextualizing positions of the various components of the childproof locking system 100. Specifically, x-, y-, and z-axes are provided which are mutually perpendicular to one another, where the x- and z-axes define a plane of the plan views shown in FIGS. 1A-1C and the y-axis is perpendicular thereto. In some embodiments, a direction of gravity may be parallel to and coincident with a negative direction of the z-axis.

In some embodiments, the first coupling element 101 may include the first outer shell 110 or other enclosure 110 and the second coupling element 102 may include the second outer shell 120 or other enclosure 120, the first and second outer shells 110, 120 respectively housing (e.g., at least partially enclosing) the first and second fasteners 111, 121. For example, each of the first and second outer shells 110, 120 may be formed as a hollow shell including one or more openings through which at least portions of object(s) may pass. In an example embodiment, the first outer shell 110 may include a first opening 103 at a first end of the first outer shell 110 and a second opening 105 at a second end of the first outer shell 110, the first end opposing the second end such that a passage may be formed through the first outer shell 110. In an additional or alternative embodiment, the second outer shell 120 may include a first opening 104 at a first end of the second outer shell 120 and a second opening 106 at a second end of the second outer shell 120, the first end opposing the second end such that a passage may be formed through the second outer shell 120. In other embodiments, one or both of the first openings 103, 104 may be configured as walls which do not permit passage of objects. In such embodiments, cavities may be formed in one or both of the first and second outer shells 110, 120 (e.g., in place of the passages).

In some embodiments, the second opening 105 may permit access to the first fastener 111 and the second opening 106 may permit access to the second fastener 121. In some embodiments, the second fastener 121 may at least partially extend through and outwardly from the second opening 106 (e.g., compelled by a magnetic force) and into the second opening 105 (and into the first outer shell 110) so as to, for example, couple the second coupling element 102 to the first coupling element 101 (e.g., to adjust the childproof locking system 100 from the third state to the second state) and engage the second fastener 121 with the first fastener 111 (e.g., to adjust the childproof locking system 100 from the second state to the first state). In additional or alternative embodiments, the second openings 105, 106 may be large enough to permit linear displacement of the second fastener 121 therewithin so as to, for example, disengage the second fastener 121 from the first fastener 111 (e.g., to adjust the childproof locking system 100 from the first state to the second state). In additional or alternative embodiments, upon disengagement of the first and second fasteners 111, 121, the second fastener 121 may be retracted back through the second opening 106 (and into the second outer shell 120) so as to, for example, decouple the first and second coupling elements 101, 102 (e.g., to adjust the childproof locking system 100 from the second state to the third state). In certain embodiments, the first and second outer shells 110, 120 may obstruct or otherwise prevent access to the first and second fasteners 111, 121 when the childproof locking system 100 is in the first state (e.g., when the second fastener 121 extends from within the second outer shell 120 and into the first outer shell 110 so as to engage with the first fastener 111).

In some embodiments, the first fastener 111 may include the first hook 112 and the second fastener 121 may include the second hook 122. As shown, the first hook 112 may extend outwardly from a body of the first fastener 111 (e.g., a portion of the first fastener 111 excepting the first hook 112) to the tip 113 such that the bend 114 may be formed between the tip 113 and the body of the first fastener 111. Similarly, the second hook 122 may extend outwardly from a body of the second fastener 121 (e.g., a portion of the second fastener 121 excepting the second hook 122) to the tip 123 such that the bend 124 may be formed between the tip 123 and the body of the second fastener 121. In certain embodiments, the first and second hooks 112, 122 may be formed with substantially similar dimensions such that the first and second hooks 112, 122 may mechanically engage with one another (when the term "substantially" is used herein, it is meant that the recited relationship, characteristic, parameter, or value need not be realized with exact precision, but that deviations or variations known to those of skill in the art may occur to an extent that does not preclude the effect the relationship, characteristic, parameter, or value was intended to provide). For example, the tip 113 of the first hook 112 may be sized so as to fit into the bend 124 of the second hook 122 and the tip 123 of the second hook 122 may be sized so as to fit into the bend 114 of the first hook 112. In other embodiments, the first and second fasteners 111, 121 may be configured for mechanical engagement through an alternative mechanical locking mechanism (e.g., which does not include the first and second hooks 112, 122 and instead includes one or more other locking elements, such as threads, pins, etc.). Accordingly, the first and second fasteners 111, 121 may each be configured as any locking element capable of reversibly engaging via mechanical and/or magnetic locking mechanisms.

In some embodiments, the first hook 112 may be less thick than the body of the first fastener 111 (e.g., along the y-axis), for example, to increase an overall structural integrity of the first fastener 111, to better retain the body of the first fastener 111 within the first outer shell 110 (e.g., a flange may at least partially circumscribe the second opening 105, such that the second opening 105 may have a smaller width along the y-axis than a thickness of the body of the first fastener 111), and/or such that the first fastener 111 may retain one or more ferromagnetic materials of greater thickness than were such ferromagnetic material(s) included within the first hook 112. Similarly, in some embodiments, the second hook 122 may be less thick than the body of the second fastener 121 (e.g., along the y-axis), for example, to increase an overall structural integrity of the second fastener 121, to better retain the body of the second fastener 121 within the second outer shell 120 (e.g., a flange may at least partially circumscribe the second opening 106, such that the second opening 106 may have a smaller width along the y-axis than a thickness of the body of the second fastener 121), and/or such that the second fastener 121 may retain one or more ferromagnetic materials of greater thickness than were such ferromagnetic material (s) included within the second hook 122. In an example embodiment, each of the second openings 105, 106 may be greater in width (e.g., along the y-axis) than a thickness of the second hook 122, such that the second hook 122 may at extend through each of the second openings 105, 106 during mechanical and magnetic engagement of the first and second coupling elements 101, 102 (e.g., when the childproof locking system 100 is in the first state).

In some embodiments, the first fastener 111 may include the first ferromagnetic material 115 and the second fastener 121 may include the second ferromagnetic material 125. The first and second ferromagnetic materials 115, 125 may be respectively positioned anywhere within the first and second fasteners 111, 121 such that a magnetic force induced therebetween may align the first and second ferromagnetic materials 115, 125 with one another. For example, the first and second ferromagnetic materials 115, 125 may be aligned along the x-axis such that the magnetic force, when the first and second coupling elements 101, 102 are positioned sufficiently close to one another, may cause the first and second fasteners 111, 121 to magnetically engage with one another. In an example embodiment, and as indicated in FIGS. 1A-1C in solid lines, the first ferromagnetic material 115 may be positioned in the tip 113 of the first hook 112 and the second ferromagnetic material 125 may be positioned in the body of the second fastener 121, such that the first and second ferromagnetic materials 115, 125 may be in physical contact, or nearly in physical contact, with one another when the childproof locking system 100 is configured in the first state. In an additional or alternative embodiment, and as indicated in FIGS. 1A-1C in dashed lines, the first ferromagnetic material 115 may be positioned in the body of the first fastener 111 and the second ferromagnetic material 125 may be positioned in the tip 123 of the second hook 122, such that the first and second ferromagnetic materials 115, 125 may be in physical contact, or nearly in physical contact, with one another when the childproof locking system 100 is configured in the first state.

In some embodiments, a total amount of ferromagnetic material, a number of ferromagnetic materials, a relative size of each ferromagnetic materials, and/or a distribution of ferromagnetic material within the childproof locking system 100 may be selected so as to balance a magnetic force used to engage the magnetic locking mechanism with a structural integrity of a material (e.g., a plastic and/or another polymer) used to form remaining components of the childproof locking system 100. For instance, in embodiments wherein two pairs of first and second ferromagnetic materials 115, 125 are included (e.g., as described above, wherein the body of the first fastener 111, the body of the second fastener 121, the tip 113 of the first hook 112, and the tip 123 of the second hook 122 each include a ferromagnetic material), the magnetic force may be increased and/or more evenly distributed (e.g., when the childproof locking system 100 is in the first state) relative to embodiments wherein only one pair of first and second ferromagnetic materials 115, 125 is included.

In some embodiments, the first outer shell 110 may be configured such that limited movement of the first fastener 111 may be permitted within the first outer shell 110. In at least one such embodiment, the first fastener 111 may be movable, slidable, or otherwise displaceable along a first track 119 formed by the first outer shell 110 (e.g., parallel to the z-axis). In an example embodiment, the first track 119 may include a linear rail or other ridge monolithically formed on an interior surface of the first outer shell 110, the linear rail of the first track 119 being mechanically engaged with a corresponding linear groove cut into the first fastener 111. In certain embodiments, the first fastener 111 may be maintained in position during disengagement of the first and second fasteners 111, 121 from one another, e.g., such that the mechanical and/or magnetic locking mechanisms may be disengaged by moving (e.g., displacing and/or rotating) the second fastener 121 away from the first fastener 111 without movement of the first fastener 111 interfering to maintain engagement of the mechanical and/or magnetic locking mechanisms. As an example, the first track 119 may include a releasable catch (not shown in FIGS. 1A-1C) that maintains the first fastener 111 in position during disengagement of the first and second fasteners 111, 121. As another example, the first fastener 111 may be maintained in position by exerting a relatively light pressure through the first opening 103, e.g., by an operator of the childproof locking system 100 holding the first fastener 111 in place with their hand. In other embodiments, the first fastener 111 may be maintained in position in each of the first and second states, that is, the first fastener 111 may be affixed to, or monolithically formed from, the first outer shell 110. In such embodiments, the first track 119 may not be present in the childproof locking system 100.

In some embodiments, the second coupling element 102 may include the carrier 126. In certain embodiments, the second outer shell 120 may house (e.g., at least partially enclose) the carrier 126, and the carrier 126 may in turn house (e.g., at least partially enclose) the second fastener 121. In an example embodiment, the second fastener 121 may not be attached to the carrier 126, such that limited movement or other relative motion of the second fastener 121 may be permitted within the carrier 126 (e.g., during adjustment of the childproof locking system 100 from the second state to the third state). However, in such an embodiment, the carrier 126 may be formed at least partially around the second fastener 121 such that the second fastener 121 may not be removed from the carrier 126 during operation of the childproof locking system 100.

In some embodiments, the second outer shell 120 may house (e.g., at least partially enclose) an additional ferromagnetic material, such that the second fastener 121 may be moved (e.g., displaced and/or rotated) away from the first fastener 111 by (magnetic) attraction of the second ferromagnetic material 125 to the additional ferromagnetic material. In certain embodiments, the additional ferromagnetic material may be a first carrier ferromagnetic material 127 housed (e.g., at least partially enclosed) within the carrier 126. In such embodiments, accordingly, the second fastener 121 may be moved (e.g., displaced and/or rotated) away from the first fastener 111 by (magnetic) attraction of the second ferromagnetic material 125 to the first carrier ferromagnetic material 127. In an example embodiment, the first carrier ferromagnetic material 127 may be a threaded fastener or bolt fastened within the carrier 126.

In some embodiments, the second coupling element 102 may include a pin 128 that attaches or otherwise couples the second fastener 121 to the carrier 126 and/or attaches or otherwise couples the carrier 126 to the second outer shell 120. In such embodiments, the pin 128 may permit limited rotation of the second fastener 121 within the carrier 126 and/or limited rotation of the carrier 126 within the second outer shell 120, e.g., via gravity causing the second fastener 121 and/or the carrier 126 to pivot about the pin 128 once the mechanical and magnetic locking mechanisms have been disengaged. In exemplary embodiments, the pin 128 may be configured as any element which permits (limited) rotation about a central axis thereof (e.g., a threaded fastener, a bolt, etc.). For instance, the pin 128 may instead be configured as a crescent rail 128 or other ridge 128 monolithically formed on the carrier 126 and/or an interior surface of the second outer shell 120, the crescent rail being mechanically engaged with a corresponding crescent groove cut into the second fastener 121 and/or the carrier 126. As another alternative, the pin 128 may be configured as a crescent groove 128 cut into the carrier 126 and/or the interior surface of the second outer shell 120, the crescent groove being mechanically engaged with a corresponding crescent rail or other ridge monolithically formed on the second fastener 121 and/or the carrier 126. Moreover, though the pin 128 is shown in FIGS. 1A-1C as being positioned in an upper middle portion of the carrier 126, the pin 128 may attach or otherwise couple the second fastener 121 anywhere within the carrier 126 and/or attach or otherwise couple the carrier 126 anywhere within the second outer shell 120 such that retraction of the second fastener 121 into the second outer shell 120 may be realized (e.g., via rotation of the second fastener 121 into the second outer shell 120 and away from the first fastener 111).

In some embodiments, the carrier 126 may be configured as a displaceable actuator which carries the second fastener 121 within the second outer shell 120. For instance, in certain embodiments, the second fastener 121 may be moved (e.g., displacing and/or rotating) away (and thereby disengaged) from the first fastener 111 (e.g., during adjustment of the childproof locking system 100 from the first state to the second state) at least by displacing the carrier 126. In at least one such embodiment, the carrier 126 may be movable, slidable, or otherwise displaceable along a second track 129 formed by the second outer shell 120 (e.g., parallel to the z-axis). In an example embodiment, the second track 129 may include a linear rail or other ridge monolithically formed on an interior surface of the second outer shell 120, the linear rail of the second track 129 being mechanically engaged with a corresponding linear groove cut into the carrier 126. In certain embodiments, the carrier 126 may be maintained in position while the first and second fasteners 111, 121 are engaged to one another, e.g., such that the mechanical and/or magnetic locking mechanisms may be maintained engaged without movement of the second fastener 121 interfering to disengage the mechanical and/or magnetic locking mechanisms. As an example, the second track 129 may include a releasable catch (not shown in FIGS. 1A-1C) that maintains the carrier 126 in position while the first and second fasteners 111, 121 are engaged. As another example, the carrier 126 may be maintained in position by exerting a relatively light pressure through the first opening 104, e.g., by an operator of the childproof locking system 100 holding the carrier 126 in place with their hand.

In some embodiments, rotation of the carrier 126 about the central axis of the pin 128 and displacement of the carrier 126 along the second track 129 may obstruct one another (e.g., a presence of the pin 128 may obstruct displacement of the carrier 126 along the second track 129 and a presence of the second track 129 may obstruct rotation of the carrier 126 about the central axis of the pin 128). As such, in certain embodiments in which the pin 128 is present in the childproof locking system 100, the second track 129 may not be present in the childproof locking system 100. In other embodiments in which the second track 129 is present in the childproof locking system 100, the pin 128 may not be present in the childproof locking system 100.

In some embodiments, the carrier 126 may not be present in the childproof locking system 100. In such embodiments, one or more aspects of the carrier 126 may instead be incorporated as one or more aspects of the second fastener 121. For instance, the second fastener 121 may include a linear groove cut therein, the linear groove mechanically engageable with the linear rail of the second track 129.

In some embodiments, the childproof locking system 100 may include a key 130 including a third ferromagnetic material 131 such that the key 130 may magnetically attract to a ferromagnetic material within the first coupling element 101 and/or the second coupling element 102. In exemplary embodiments, to adjust the childproof locking system 100 from the first state to the second state, the key 130 may be positioned at the first end of the second outer shell 120 (e.g., at least partially through the first opening 104 or against a wall formed in place of the first opening 104) such that the third ferromagnetic material 131 may be aligned with a ferromagnetic material within the carrier 126 and, upon sliding the key 130 along the first end of the second outer shell 120 (e.g., within the first opening 104 or against a wall formed in place of the first opening 104) such that the third ferromagnetic material 131 maintains (magnetic) attraction with the ferromagnetic material within the carrier 126, the first and second fasteners 111, 121 may become disengaged. In additional or alternative embodiments, to adjust the childproof locking system 100 from the first state to the second state, the key 130 may be positioned at the first end of the first outer shell 110 (e.g., at least partially through the first opening 103 or against a wall formed in place of the first opening 103) such that the third ferromagnetic material 131 may be aligned with the first ferromagnetic material 115 and, upon sliding the key 130 along the first end of the first outer shell 110 (e.g., within the first opening 103 or against a wall formed in place of the first opening 103) such that the third ferromagnetic material 131 maintains (magnetic) attraction with the first ferromagnetic material 115, the first and second fasteners 111, 121 may become disengaged.

In some embodiments, the carrier 126 may include a second carrier ferromagnetic material 132 positioned so as to be aligned with the third ferromagnetic material 131 upon such positioning of the key 130. In such embodiments, a significant magnetic attraction may not necessarily be induced between the second ferromagnetic material 125 and the third ferromagnetic material 131, because a magnetic attraction may be induced between the second carrier ferromagnetic material 132 and the third ferromagnetic material 131 sufficient to magnetically attract the key 130 to the carrier 126. In such embodiments, moreover, the first carrier ferromagnetic material 127 may be present so as to cause rotation of the second fastener 121 within the carrier 126 while the key 130 displaces the carrier 126 away from the first fastener 111.

In other embodiments, the key 130 may be positioned so as to align and magnetically attract the third ferromagnetic material 131 to the second ferromagnetic material 125. In such embodiments, the first carrier ferromagnetic material 127 and/or the second carrier ferromagnetic material 132 may not be present, and the key 130 may be utilized for both displacement and rotation of the second fastener 121 away from the first fastener 111.

For illustrative purposes, FIGS. 1B and 1C show arrows 141, 142, and 143 indicating exemplary motion of the second fastener 121 during disengagement of the second fastener 121 from the first fastener 111 (e.g., during adjustment of the childproof locking system 100 from the first state to the second state, as shown by the arrow 141, and from the second state to the third state, as shown by the arrows 142 and 143) in at least one embodiment. As shown by the arrow 141, the carrier 126 may be displaced (e.g., slid along the second track 129 parallel to the z-axis) via the key 130 (or a hand of an operator when no key 130 is present) while the first fastener 111 is maintained in position. While the carrier 126 is displaced, the second fastener 121 may be displaced therewith (e.g., carried by the carrier 126). Substantially simultaneously to or immediately following the displacement of the carrier 126, and as shown by the arrow 142, the second fastener 121 may be rotated within the carrier 126 (e.g., about a rotational axis parallel to the y-axis) and away from the first fastener 111. During the rotation, the second fastener 121 may pivot about a fixed point within the carrier 126, or, as shown by the arrow 143, the second fastener 121 may be displaced (e.g., parallel to the x-axis) away from the first fastener 111 perpendicular to initial displacement (e.g., as shown by the arrow 141) of the carrier 126 away from the first fastener 111. As such, the childproof locking system 100 may be adjusted from the first state to the second state upon overcoming the mechanical and/or magnetic engagement of the first and second fasteners 111, 121 by displacing the second fastener 121 away from the first fastener 111 and the childproof locking system 100 may be adjusted from the second state to the third state upon physically separating or otherwise decoupling the first and second coupling elements 101, 102 by retracting the second fastener 121 within the second outer shell 120 and rotating the second fastener 121 away from the first fastener 111.

In certain embodiments, the childproof locking system 100 may be used whether oriented as shown in FIGS. 1A-1C or rotated 180° about the y-axis. For instance, in at least one such embodiment, the first coupling element 101 may include the first track 119, such that the first fastener 111 may be linearly displaceable within the first outer shell 110 while the second fastener 121 is maintained in position (e.g., during adjustment of the childproof locking system 100 from the first state to the second state). In certain such embodiments, magnetic force(s) (e.g., from the first carrier ferromagnetic material 127 and/or the third ferromagnetic material 131 attracting the second ferromagnetic material 125) may result in the second fastener 121 being retracted within the second outer shell 120 (e.g., during adjustment of the childproof locking system 100 from the second state to the third state) without use of or reliance on gravity.

In some embodiments, upon affixing or otherwise adhering one of the first and second outer shells 110, 120 to a door of a storage compartment, affixing or otherwise adhering the other one of the first and second outer shells 110, 120 to a fixed surface or another door of the storage compartment, and adjusting the childproof locking system 100 from the third state to the first state, an interior of the storage compartment may not be accessible. In additional or alternative embodiments, upon affixing or otherwise adhering the one of the first and second outer shells 110, 120 to the door of a storage compartment, affixing or otherwise adhering the other one of the first and second outer shells 110, 120 to the fixed surface or the other door of the storage compartment, and adjusting the childproof locking system 100 from the first state to the third state, the interior of the storage compartment may be accessible. As such, in certain embodiments, the storage compartment may include a door and a fixed surface to which the first and second outer shells 110, 120 may be affixed or otherwise adhered (e.g., a single-door refrigerator). In additional or alternative embodiments, the storage compartment may include two doors to which the first and second shells 110, 120 may be affixed or otherwise adhered (e.g., a dual-door or "French door" refrigerator). In some embodiments, once the childproof locking system 100 is installed so as to limit access to the interior of the storage compartment and the first and second coupling elements 101, 102 are decoupled (e.g., the childproof locking system 100 is adjusted to the third state), opening a door of the storage compartment may result in the first and second coupling elements 101, 102 separating along the x-axis and/or the y-axis (e.g., the door of the storage compartment may be opened via a linear sliding motion or a rotational swinging motion). In an example embodiment, the interior of the storage compartment may include perishable food or other refrigerated items (e.g., the storage compartment may be a refrigerator, a freezer, or the like) or dry goods or non-food items (e.g., the storage compartment may be a cupboard, a pantry, or the like).

In some embodiments, the first outer shell 110 may include a first smooth exterior surface which may be affixable or otherwise adherable to the storage compartment (e.g., to the fixed surface or one of the doors). Specifically, in certain such embodiments, the first outer shell 110 may be formed such that one or more flat, uninterrupted portions are present on the first smooth exterior surface. In some embodiments, the first coupling element 101 may include a first adhesive strip 107 layered onto the first outer shell 110 (e.g., onto the one or more flat, uninterrupted portions of the first smooth exterior surface), the first adhesive strip 107 including adhesive to affix or otherwise adhere the first coupling element 101 to the storage compartment (e.g., to the fixed surface or one of the doors). In certain such embodiments, the first adhesive strip 107 may be positioned on the first smooth exterior surface without any portion of the first adhesive strip 107 bending around or overhanging from the first outer shell 110 (that is, the first smooth exterior surface may include a flat, uninterrupted portion which is equal to or greater than an area of the first adhesive strip 107).

Similarly, in some embodiments, the second outer shell 120 may include a second smooth exterior surface which may be affixable or otherwise adherable to the storage compartment (e.g., to the fixed surface or one of the doors). Specifically, in certain such embodiments, the second outer shell 120 may be formed such that one or more flat, uninterrupted portions are present on the second smooth exterior surface. In some embodiments, the second coupling element 102 may include a second adhesive strip 108 layered onto the second outer shell 120 (e.g., onto the one or more flat, uninterrupted portions of the second smooth exterior surface), the second adhesive strip 108 including adhesive to affix or otherwise adhere the second coupling element 102 to the storage compartment (e.g., to the fixed surface or one of the doors). In certain such embodiments, the second adhesive strip 108 may be positioned on the second smooth exterior surface without any portion of the second adhesive strip 108 bending around or overhanging from the second outer shell 120 (that is, the second smooth exterior surface may include a flat, uninterrupted portion which is equal to or greater than an area of the second adhesive strip 108).

Figure 2A:
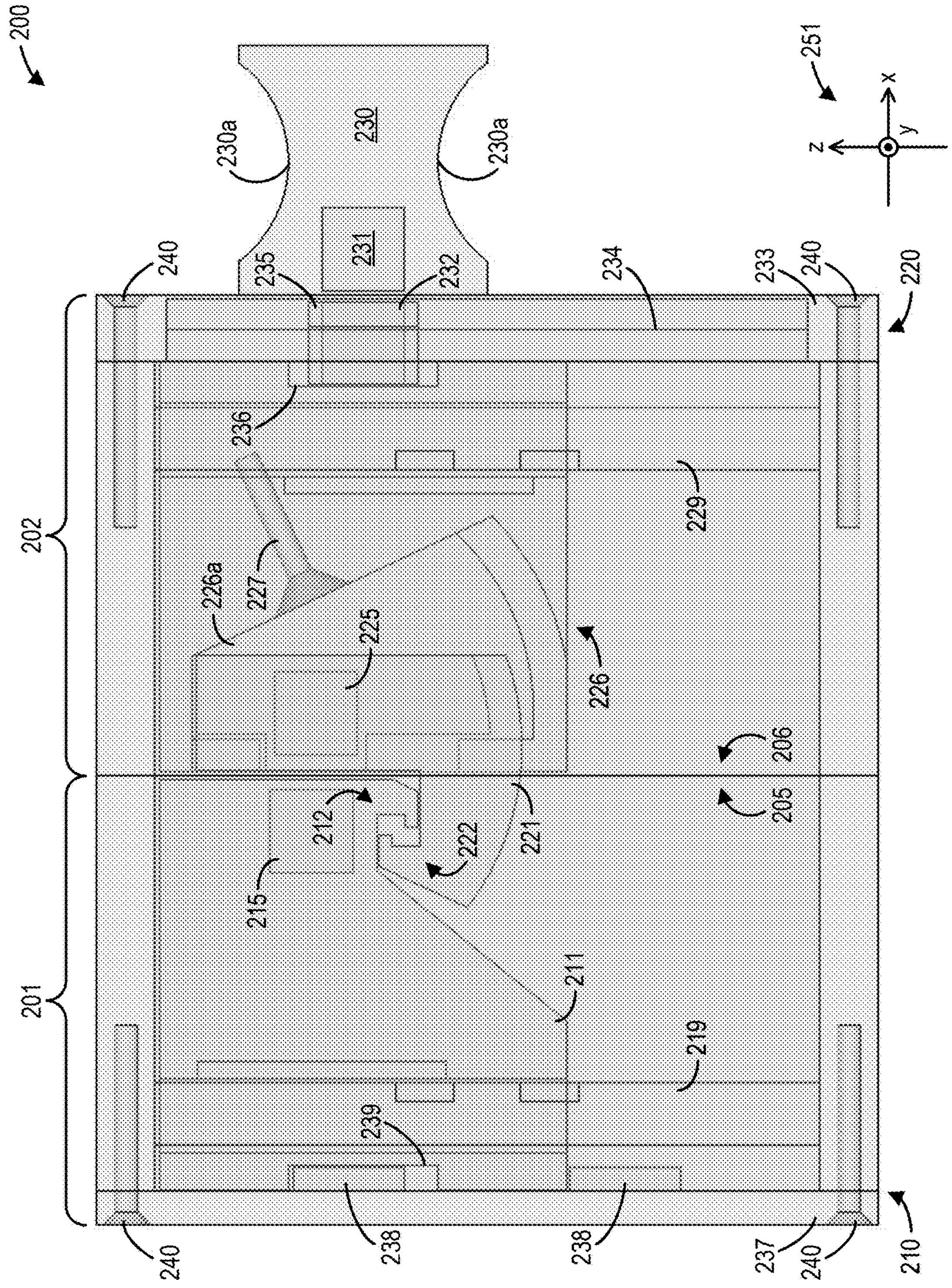
FIG. 2A shows a partially transparent view of a childproof locking system including first and second coupling elements and a key, the childproof locking system being in a first state in which a first fastener of the first coupling element is mechanically and magnetically engaged to a second fastener of the second coupling element, in accordance with at least one embodiment.
Figure 2B:
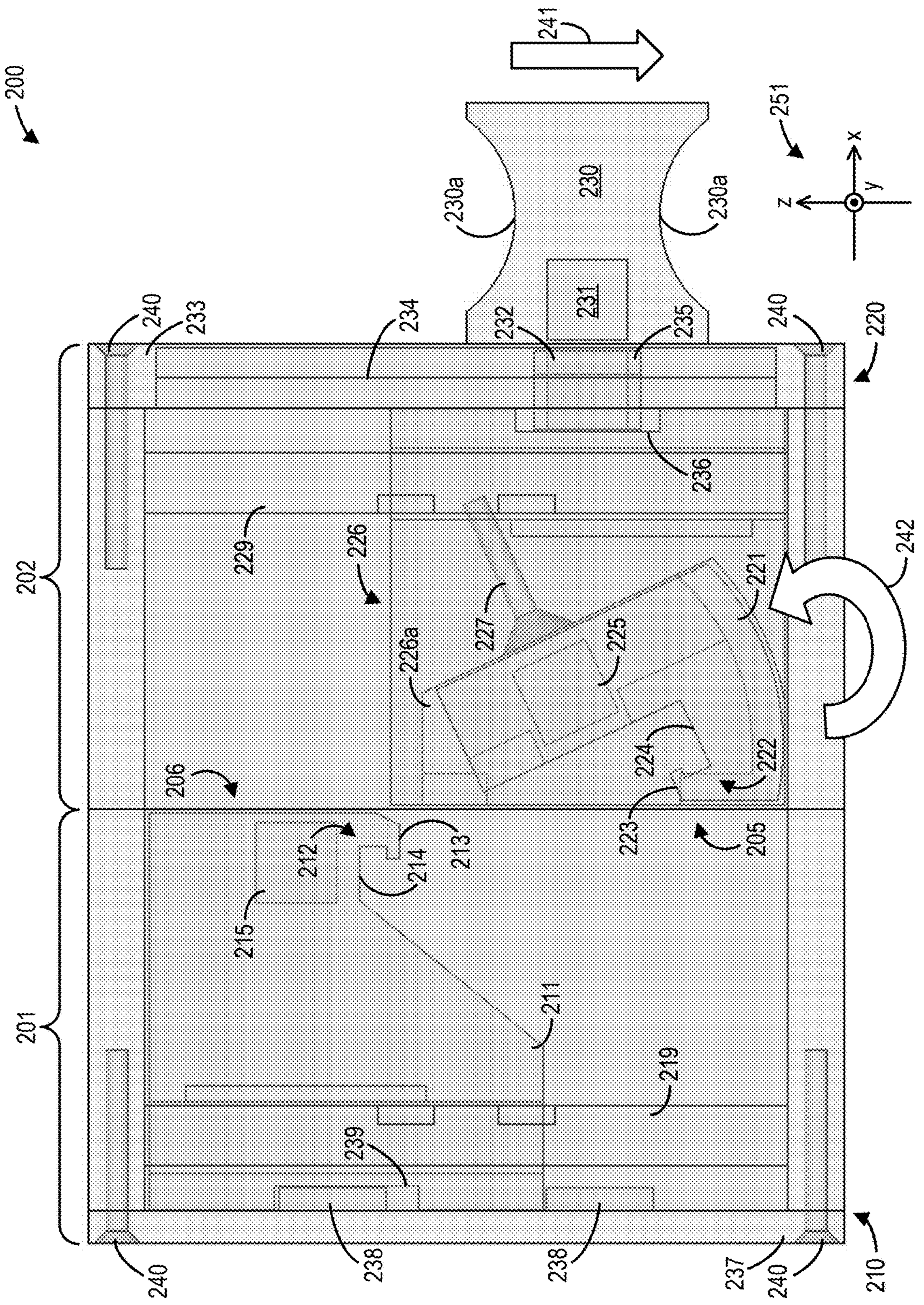
FIG. 2B shows a partially transparent view of the childproof locking system of FIG. 2A in a third state in which the first fastener of the first coupling element is disengaged from the second fastener of the second coupling element, wherein the childproof locking system may be adjusted from the first state to the third state by magnetically engaging the key with the second coupling element and sliding the key, in accordance with at least one embodiment.

Referring now to FIGS. 2A and 2B, partially transparent views of a childproof locking system 200 including first and second coupling elements 201, 202 and a key 230 are shown, where FIG. 2A depicts the childproof locking system 200 in a first state and FIG. 2B depicts the childproof locking system 200 in a third state. As shown in FIG. 2A, in the first state, a first fastener 211 of the first coupling element 201 may be mechanically and magnetically engaged with a second fastener 221 of the second coupling element 202. The childproof locking system 200 may be adjusted from the first state to a second state (not shown in FIGS. 2A and 2B, but similar in configuration to the second state shown in FIG. 1B) in which the first fastener 211 may be disengaged from the second fastener 221, though the second fastener 221 may extend at least partially into a first outer shell 210 of the first coupling element 201. As shown in FIG. 2B, in the third state, the first coupling element 201 may be decoupled from the second coupling element 202, wherein the second fastener 221 may be retracted within a second outer shell 220 of the second coupling element 202. The first and second fasteners 211, 221 may be reversibly engageable with one another such that the childproof locking system 200 may be adjusted from the first state to the third state and vice versa, e.g., so as to limit access to an interior of a storage compartment. For example, the childproof locking system 200 may be adjusted: from the first state to the second state by magnetically engaging the key 230 with the second coupling element 202 and sliding the key 230; and from the second state to the third state via magnetic engagement of a ferromagnetic material 225 of the second fastener 221 with another ferromagnetic material included in the second coupling element 202, such that the second fastener 221 may retract within the second outer shell 220. In some embodiments, the childproof locking system 200 may be assembled and configured similarly to the childproof locking system 100 of FIGS. 1A-1C. Accordingly, in certain embodiments, the description provided above with reference to FIGS. 1A-1C may be additionally applied to the embodiment(s) depicted in FIGS. 2A and 2B. Moreover, in certain embodiments, additional components and/or functionalities may be included in the childproof locking system 200 and which may additionally be applied to the embodiment(s) of FIGS. 1A-1C.

To indicate suitability for substitution in certain non-limiting embodiments, similar reference indicators have been applied to elements in FIGS. 2A and 2B which may be interchangeable with elements in FIGS. 1A-1C. For example, elements depicted in FIGS. 2A and 2B may be labeled with the same numbers for the "tens" and "ones" positions as those elements in FIGS. 1A-1C which may be interchangeable in such examples, but may utilize a "2" in the "hundreds" position instead of a "1" (e.g., the first fastener 111 of FIGS. 1A-1C and the first fastener 211 of FIGS. 2A and 2B may be interchangeable in certain non-limiting embodiments). As such, in certain embodiments, description of any such interchangeable elements described hereinabove with reference to FIGS. 1A-1C may substitute or supplement description provided below with reference to FIGS. 2A and 2B. Alphabetical indicators (e.g., "a" in "226*a*") in FIGS. 2A and 2B may, in some examples, identify subcomponents included as a part of another component (e.g., "226*a*" may identify a subcomponent of "226").

A set of Cartesian coordinate axes 251 is shown in FIGS. 2A and 2B for contextualizing positions of the various components of the childproof locking system 200. Specifically, x-, y-, and z-axes are provided which are mutually perpendicular to one another, where the x- and z-axes define a plane of the partially transparent views shown in FIGS. 2A and 2B and the y-axis is perpendicular thereto. In some embodiments, a direction of gravity may be parallel to and coincident with a negative direction of the z-axis.

In some embodiments, the first outer shell 210 may include a wall 237 at a first end of the first outer shell 210 and an opening 205 at a second end of the first outer shell 210, the first end opposing the second end. In an example embodiment, the wall 237 may delimit at least a portion of a cavity open at the second end (e.g., the opening 205), such that objects may be placed within the cavity without passing through the first end of the first outer shell 210 (e.g., being obstructed by the wall 237). As shown, in certain embodiments, the wall 237 may be secured to a body of the first outer shell 210 (e.g., a portion of the first outer shell 210 excepting the wall 237) with one or more of a plurality of fasteners 240 (e.g., threaded fasteners, bolts, integrally molded clip fasteners, etc.). In other embodiments, the wall 237 may be monolithically formed from the first outer shell 210.

In some embodiments, the wall 237 may include one or more catches 238 to maintain a position of the first fastener 211. In at least one such embodiment, the one or more catches 238 may be monolithically formed on an interior surface of the wall 237, the one or more catches 238 configured as protrusions or other projections into the cavity. In certain embodiments, one of the one or more catches 238 may be mechanically engaged with an indentation 239 cut into the first fastener 211. As such, movement of the first fastener 211 within the cavity may be obstructed via engagement of the one of the one or more catches 238 and the indentation 239.

In some embodiments, the second outer shell 220 may include a wall 233 at a first end of the second outer shell 220 and an opening 206 at a second end of the second outer shell 220, the first end opposing the second end. In an example embodiment, the wall 233 may delimit at least a portion of a cavity open at the second end (e.g., the opening 206), such that objects may be placed within the cavity without passing through the first end of the second outer shell 220 (e.g., being obstructed by the wall 233). As shown, in certain embodiments, the wall 233 may be secured to a body of the second outer shell 220 (e.g., a portion of the second outer shell 220 excepting the wall 233) with one or more of the plurality of fasteners 240 (e.g., threaded fasteners, bolts, integrally molded clip fasteners, etc.). In other embodiments, the wall 233 may be monolithically formed from the second outer shell 220.

In some embodiments, the wall 233 may include a track 234 (e.g., parallel to the z-axis) along which an auxiliary carrier 235 including a second carrier ferromagnetic material 232 may be moved, slid, or otherwise displaced. In an example embodiment, the track 234 may include at least one linear rail or other ridge monolithically formed on an interior surface of the wall 233, the at least one linear rail of the track 234 being mechanically engaged with a corresponding linear groove cut into the auxiliary carrier 235. For example, the track 234 may include a pair of linear rails facing one another, the pair of linear rails monolithically formed at opposing flanges of the wall 233, and the auxiliary carrier 235 may include a pair of linear grooves configured to respectively fit to the pair of linear rails.

In some embodiments, the second coupling element 202 may include a carrier 226 including an indentation 236 to mechanically engage with the auxiliary carrier 235. In an example embodiment, when the carrier 226 is engaged with the auxiliary carrier 235, movement of the auxiliary carrier 235 (e.g., parallel to the z-axis) may result in corresponding movement of the carrier 226 (e.g., parallel to the z-axis). In certain embodiments, the auxiliary carrier 235 may remain engaged with the carrier 226 during use of the childproof locking system 200 (e.g., regardless of whether the childproof locking system 200 is in the first state or in the second state).

In some embodiments, the carrier 226 may include a cavity 226*a* in which the second fastener 221 may be displaced (e.g., during adjustment of the childproof locking system 200 from the first state to the second state). In certain embodiments, the cavity 226*a* may delimit a rotational path of the second fastener 221 and may include one or more stops or catches to retain the second fastener 221 within the carrier 226.

In some embodiments, and as shown in FIG. 2A, when the childproof locking system 200 is in the first state, the first and second fasteners 211, 221 may not be accessible to an operator of the childproof locking system 200 (e.g., since the first and second coupling elements 201, 202 may be aligned such that unobstructed access to the openings 205 and 206 is prevented). As such, in certain embodiments, there may be no way to adjust the childproof locking system 200 from the first state to the second state excepting through use of the key 230. In such embodiments, and as shown by an arrow 241, the carrier 226 may be displaced (e.g., slid along a track 229 parallel to the z-axis) by magnetically engaging a ferromagnetic material 231 of the key 230 with the second carrier ferromagnetic material 232 of the auxiliary carrier 235. Specifically, because the auxiliary carrier 235 may in turn be mechanically engaged with the carrier 226, sliding or other displacement of the key 230 (e.g., parallel to the z-axis) while maintaining magnetic engagement with the auxiliary carrier 235 may result in the carrier 226 being correspondingly displaced. In some embodiments, the key 230 may include one or more indentations 230*a*, e.g., each shaped to fit one or more fingers so as to provide ease of gripping during handheld use of the key 230. Once the carrier 226 is displaced, and as shown by an arrow 242, the second fastener 221 may rotate within the cavity 226*a* at least partially due to magnetic engagement of a ferromagnetic material 225 of the second fastener 221 with a first carrier ferromagnetic material 227 of the carrier 226.

In some embodiments, the childproof locking system 200 may be used whether oriented as shown in FIGS. 2A and 2B or rotated 180° about the y-axis. For instance, because the second fastener 221 may rotate within the cavity 226*a* at least partially due to the magnetic engagement of the ferromagnetic material 225 with the first carrier ferromagnetic material 227, reliance on gravity in adjusting between states of the childproof locking system 200 may be reduced relative to certain other embodiments described herein.

In some embodiments, the wall 237 may instead be included in the second outer shell 220 (e.g., in place of the wall 233 and the auxiliary carrier 235), and the wall 233 and the auxiliary carrier 235 may instead be included in the first outer shell 210 (e.g., in place of the wall 237). For instance, in certain such embodiments, the plurality of fasteners 240 may be removed so that the wall 237 may be swapped with the wall 233 and the auxiliary carrier 235 and then the plurality of fasteners 240 may be repositioned to secure the wall 233 to the body of the first outer shell 210 and to secure the wall 237 to the body of the second outer shell 220. In such embodiments, one of the one or more catches 238 of the wall 237 secured to the second outer shell 220 may mechanically engage with the indentation 236 of the carrier 226, and the auxiliary carrier 235, engaged with the wall 233 secured to the first outer shell 210, may mechanically engage with the indentation 239 of the first fastener 211. Accordingly, in such embodiments, to adjust the childproof locking system 200 from the first state to the second state, the first fastener 211 may be displaced (e.g., slid along a track 219 parallel to the z-axis) by magnetically engaging the ferromagnetic material 231 of the key 230 with the second carrier ferromagnetic material 232 of the auxiliary carrier 235, permitting the second fastener 221 to rotate within the cavity 226*a*, e.g., attracted by the first carrier ferromagnetic material 227.

Figure 3A:
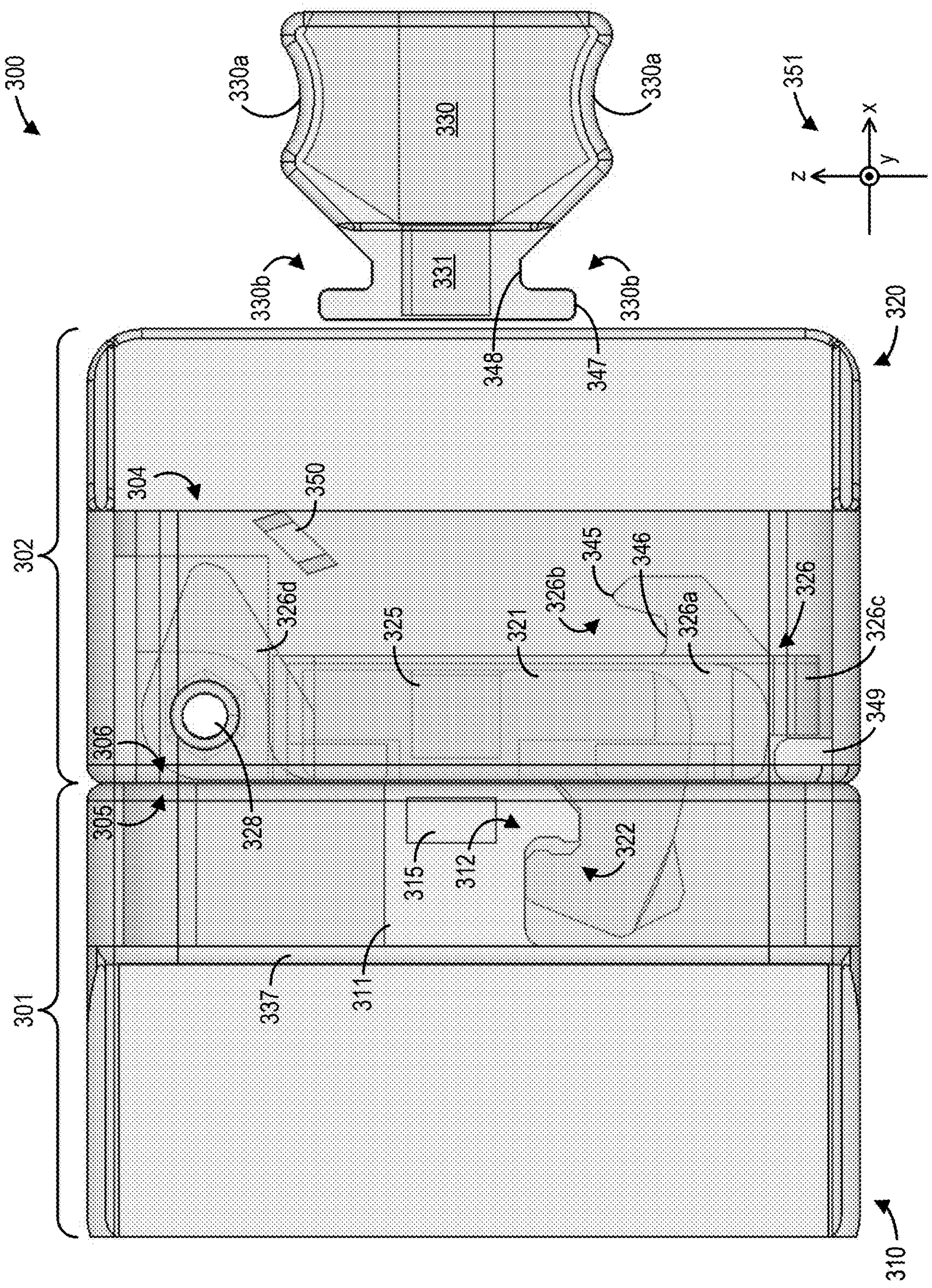
FIG. 3A shows a partially transparent view of a childproof locking system including first and second coupling elements and a key, the childproof locking system being in a first state in which a first fastener of the first coupling element is mechanically and magnetically engaged to a second fastener of the second coupling element, in accordance with at least one embodiment.
Figure 3B:
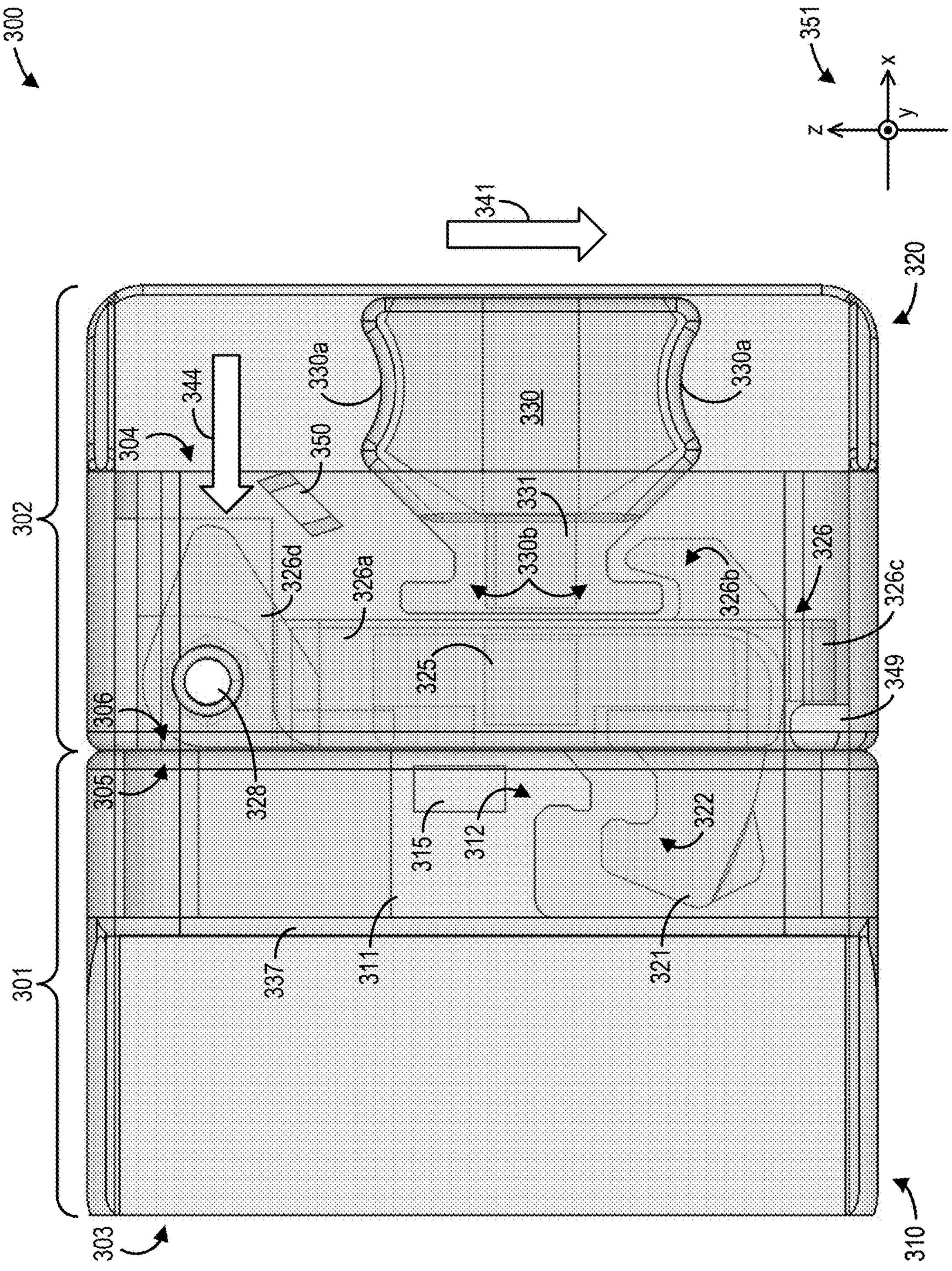
FIG. 3B shows a partially transparent view of the childproof locking system of FIG. 3A in a second state in which the first fastener of the first coupling element is mechanically disengaged from the second fastener of the second coupling element, wherein the childproof locking system may be adjusted from the first state to the second state by mechanically engaging the key with a carrier which houses the second fastener and sliding the key, in accordance with at least one embodiment.
Figure 3C:
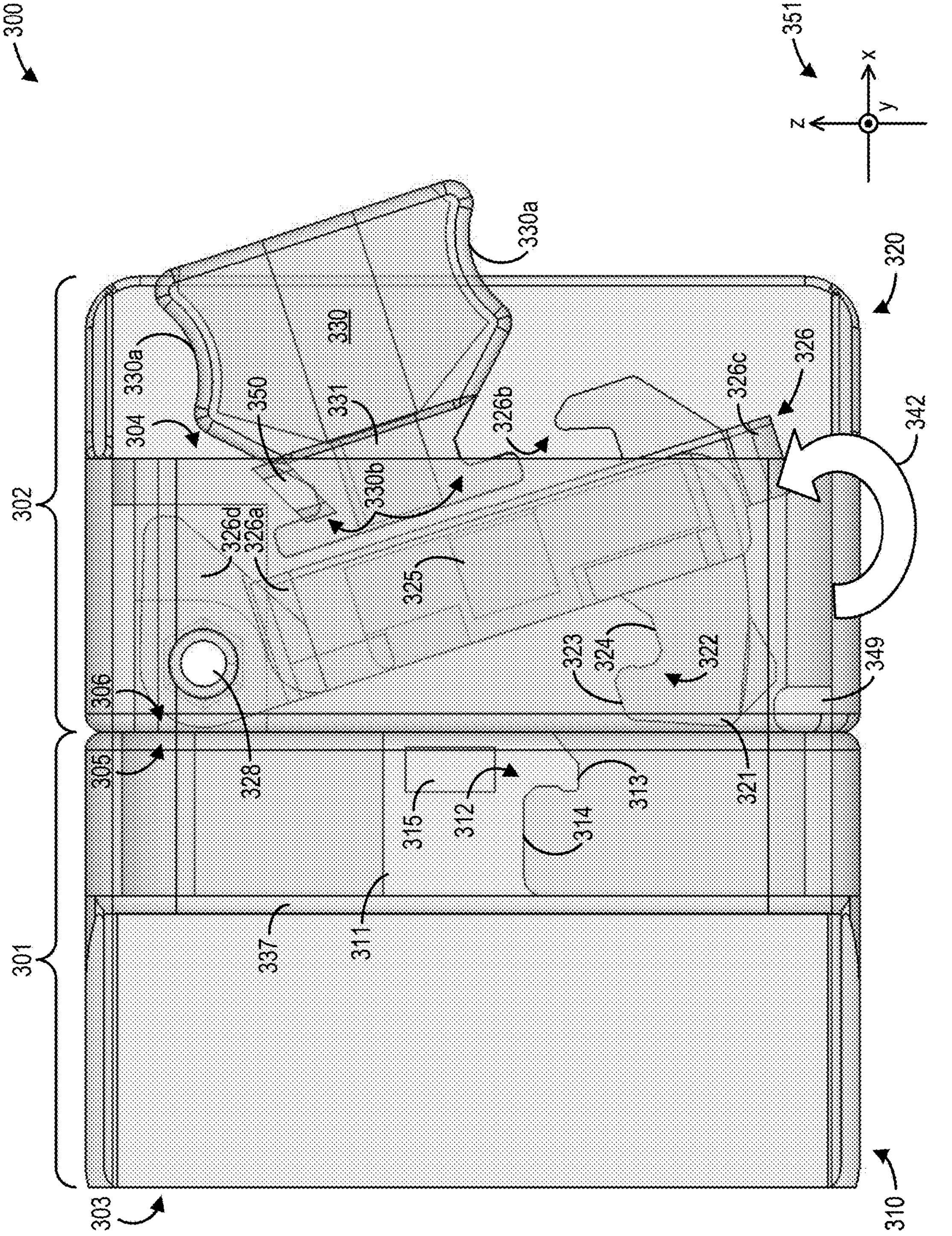
FIG. 3C shows a partially transparent view of the childproof locking system of FIG. 3A in a third state in which the first fastener of the first coupling element is disengaged from the second fastener of the second coupling element, wherein the childproof locking system may be adjusted from the second state to the third state by using the mechanically engaged key to rotate the carrier, in accordance with at least one embodiment.

Referring now to FIGS. 3A-3C, partially transparent views of a childproof locking system 300 including first and second coupling elements 301, 302 and a key 330 are shown, where FIG. 3A depicts the childproof locking system 300 in a first state, FIG. 3B depicts the childproof locking system 300 in a second state, and FIG. 3C depicts the childproof locking system 300 in a third state. As shown in FIG. 3A, in the first state, a first fastener 311 of the first coupling element 301 may be mechanically and magnetically engaged with a second fastener 321 of the second coupling element 302. As shown in FIG. 3B, in the second state, the first fastener 311 may at least be mechanically disengaged from the second fastener 321. As shown in FIG. 3C, in the third state, the first fastener 311 may be disengaged from the second fastener 321, such that the first coupling element 301 may be decoupled from the second coupling element 302. The first and second fasteners 311, 321 may be reversibly engageable with one another such that the childproof locking system 300 may be adjusted from the first state to the second state and vice versa and from the second state to the third state and vice versa, e.g., so as to limit access to an interior of a storage compartment. For example, the childproof locking system 300 may be adjusted: from the first state to the second state by magnetically engaging a ferromagnetic material 331 of the key 330 with a ferromagnetic material 325 of the second fastener 321 and mechanically engaging the key 330 with a carrier 326 which houses the second fastener 321, and sliding the key 330 (e.g., to displace the second fastener 321 within the carrier 326 so as to mechanically disengage the first and second fasteners 311, 321); and from the second state to the third state by using the mechanically engaged key 330 to rotate the carrier 326 and thereby the second fastener 321 (e.g., to displace the carrier 326 so as to magnetically disengage the first and second fasteners 311, 321, such that the first coupling element 301 may be decoupled from the second coupling element 302). In some embodiments, the childproof locking system 300 may be assembled and configured similarly to the childproof locking system 100 of FIGS. 1A-1C and/or the childproof locking system 200 of FIGS. 2A and 2B. Accordingly, in certain embodiments, the description provided above with reference to FIGS. 1A-2B may be additionally applied to the embodiment(s) depicted in FIGS. 3A-3C. Moreover, in certain embodiments, additional components and/or functionalities may be included in the childproof locking system 300 and which may additionally be applied to the various embodiments of FIGS. 1A-2B.

To indicate suitability for substitution in certain non-limiting embodiments, similar reference indicators have been applied to elements in FIGS. 3A-3C which may be interchangeable with elements in FIGS. 1A-2B. For example, elements depicted in FIGS. 3A-3C may be labeled with the same numbers for the "tens" and "ones" positions as those elements in FIGS. 1A-1C which may be interchangeable in such examples, but may utilize a "3" in the "hundreds" position instead of a "1" (e.g., the first fastener 111 of FIGS. 1A-1C and the first fastener 311 of FIGS. 3A-3C may be interchangeable in certain non-limiting embodiments). As such, in certain embodiments, description of any such interchangeable elements described hereinabove with reference to FIGS. 1A-2B may substitute or supplement description provided below with reference to FIGS. 3A-3C. Alphabetical indicators (e.g., "a" in "326*a*") in FIGS. 3A-3C may, in some examples, identify subcomponents included as a part of another component (e.g., "326*a*" may identify a subcomponent of "326").

A set of Cartesian coordinate axes 351 is shown in FIGS. 3A-3C for contextualizing positions of the various components of the childproof locking system 300. Specifically, x-, y-, and z-axes are provided which are mutually perpendicular to one another, where the x- and z-axes define a plane of the partially transparent views shown in FIGS. 3A-3C and the y-axis is perpendicular thereto. In some embodiments, a direction of gravity may be parallel to and coincident with a negative direction of the z-axis.

In some embodiments, a first outer shell 310 of the first coupling element 301 may include a wall 337 at a first end of the first outer shell 310 and an opening 305 at a second end of the first outer shell 310, the first end opposing the second end. In an example embodiment, the wall 337 may delimit at least a portion of a cavity open at the second end (e.g., the opening 305), such that objects may be placed within the cavity without passing through to the first end of the first outer shell 310 (e.g., being obstructed by the wall 337). As shown, in certain embodiments, the first fastener 311 may be monolithically formed on the wall 337, such that a position of the first fastener 311 may be maintained throughout use of the childproof locking system 300. As shown, in certain embodiments, the wall 337 may be monolithically formed from the first outer shell 310. In other embodiments, the wall 337 may be secured to a body of the first outer shell 310 (e.g., a portion of the first outer shell 310 excepting the wall 337) with a plurality of fasteners (e.g., threaded fasteners, bolts, integrally molded clip fasteners, etc.).

In some embodiments, a second outer shell 320 of the second coupling element 302 may include a first opening 304 at a first end of the second outer shell 320 and a second opening 306 at a second end of the second outer shell 320, the first end opposing the second end such that a passage may be formed through the second outer shell 320.

In some embodiments, the second coupling element 302 may include a carrier 326 including a cavity 326*a* in which the second fastener 321 may be displaced (e.g., during adjustment of the childproof locking system 300 from the first state to the second state). In certain embodiments, the cavity 326*a* may delimit a linear displacement path of the second fastener 321 and may include one or more stops or catches to retain the second fastener 321 within the carrier 326.

In some embodiments, the carrier 326 may be mechanically engageable with the key 330 (e.g., to adjust the childproof locking system 300 from the first state to the second state, from the second state to the third state, etc.) via a mechanical locking mechanism. In some embodiments, the mechanical locking mechanism may include, on the carrier 326, an auxiliary hook 326*b* and, on the key 330, one or more key hooks 330*b*, where mechanical engagement of the carrier 326 and the key 330 may include a tip 345 of the auxiliary hook 326*b* being seated in a bend 348 of one of the one or more key hooks 330*b* and a tip 347 of the one of the one or more key hooks 330*b* being seated in a bend 346 of the auxiliary hook 326*b*. In some embodiments, the auxiliary hook 326*b* may extend outwardly from a body of the carrier 326 (e.g., a portion of the carrier 326 excepting the auxiliary hook 326*b*) to the tip 345 such that the bend 346 may be formed between the tip 345 and the body of the carrier 326. Similarly, each given key hook 330*b* of the one or more key hooks 330*b* may extend outwardly from a body of the key 330 (e.g., a portion of the key 330 excepting the one or more key hooks 330*b*) to the tip 347 of the given key hook 330*b* such that the bend 348 of the given key hook 330*b* may be formed between the tip 347 of the given key hook 330*b* and the body of the key 330. In certain embodiments, the auxiliary hook 326*b* and each of the one or more key hooks 330*b* may be formed with substantially similar dimensions such that the auxiliary hook 326*b* may mechanically engage with any given one of the one or more key hooks 330*b*. For example, the tip 345 of the auxiliary hook 326*b* may be sized so as to fit into the bend 348 of any given one of the one or more key hooks 330*b* and the tip 347 of any given one of the one or more key hooks 330*b* may be sized so as to fit into the bend 346 of the auxiliary hook 326*b*. In other embodiments, the carrier 326 and the key 330 may be configured for mechanical engagement through an alternative mechanical locking mechanism (e.g., which does not include the auxiliary hook 326*b* and the one or more key hooks 330*b* and instead includes one or more other locking elements, such as threads, pins, etc.). Accordingly, the carrier 326 and the key 330 may each be configured as any element capable of reversibly engaging via the mechanical locking mechanism (and/or a magnetic locking mechanism, as described in detail above for similarly numbered elements with reference to FIGS. 1A-2B).

In some embodiments, the carrier 326 may include first and second stops 326*c* and 326*d* which may be brought to rest against portions of the second outer shell 320 during certain operations of the childproof locking system 300. For example, first and second stops 349, 350 may be monolithically formed from the second outer shell 320. In at least one such embodiment, the carrier 326 may be rotatable between the first and second stops 349, 350 and/or other portion(s) of the second outer shell 320. In an example embodiment, the first stop 326*c* may be brought to rest against the first stop 349 when the childproof locking system 300 is in the first state. In an additional or alternative embodiment, the second stop 326*d* may be brought to rest against an interior surface (e.g., a wall) of the second outer shell 320 when the childproof locking system 300 is in the third state. In an additional or alternative embodiment, the body of the carrier 326 may be brought to rest against the second stop 350 when the childproof locking system is in the third state. In an additional or alternative embodiment, the key 330 may be brought to rest against the second stop 350 when the childproof locking system 300 is in the third state (e.g., to utilize the key 330 to prevent the carrier 326 from being displaced within the second outer shell 320 and maintain the childproof locking system 300 in the third state).

In some embodiments, and as shown by an arrow 344, the key 330 may be positioned at least partially within the second outer shell 320 (e.g., via the first opening 304) so as to magnetically engage with the second fastener 321. For example, the key 330 may be positioned such that the ferromagnetic material 331 may be magnetically engaged with the ferromagnetic material 325. Accordingly, and as shown by an arrow 341, the second fastener 321 may be moved, slid, or otherwise displaced (e.g., parallel to the z-axis) within the cavity 326*a* and away from the first fastener 311 by correspondingly displacing the key 330 until the key 330 mechanically engages with the carrier 326. For example, the key 330 may be displaced such that the key hook 330*b* may be mechanically engaged with the auxiliary hook 326*b* (e.g., while maintaining magnetic engagement of the key 330 and the second fastener 321). Once the key 330 is mechanically engaged with the carrier 326, and as shown by an arrow 342, the carrier 326 may be rotated (e.g., about a pin 328) within the second outer shell 320 such that the second fastener 321 may correspondingly be rotated away from the first fastener 311.

In some embodiments, the childproof locking system 300 may be used whether oriented as shown in FIGS. 3A-3C or rotated 180° about the y-axis. For instance, because the second fastener 321 may be displaced within the cavity 326*a* at least partially due to the magnetic engagement of the ferromagnetic material 325 with the ferromagnetic material 331 and because the carrier 326 may be rotated within the second outer shell 320 at least partially due to the mechanical engagement of the auxiliary hook 326*b* with the key hook 330*b*, reliance on gravity in adjusting between states of the childproof locking system 300 may be reduced relative to certain other embodiments described herein.

Figure 4:
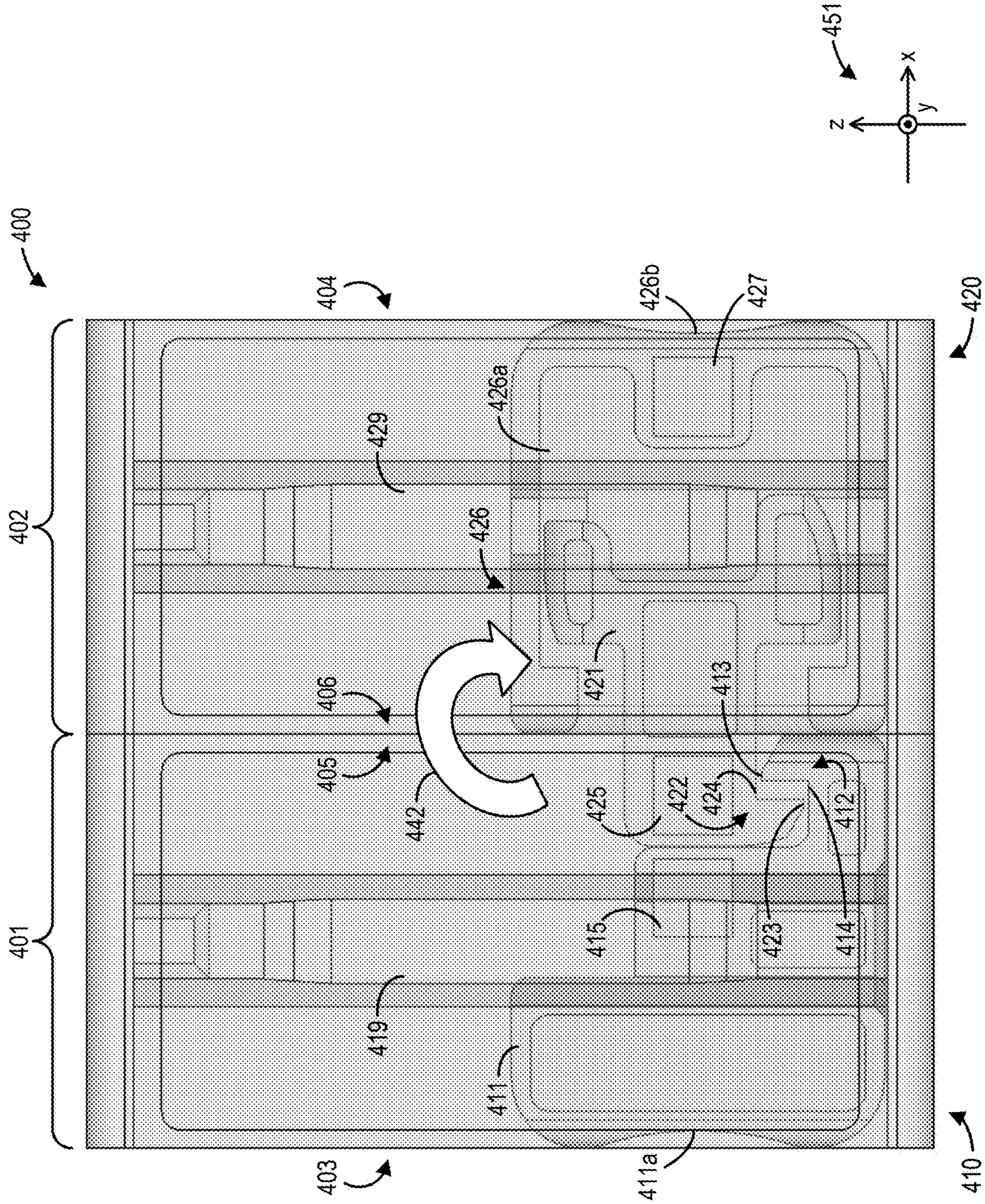
FIG. 4 shows a partially transparent view of a childproof locking system including first and second coupling elements, the childproof locking system being in a first state in which a first fastener of the first coupling element is mechanically and magnetically engaged to a second fastener of the second coupling element, in accordance with at least one embodiment.

Referring now to FIG. 4, a partially transparent view of a childproof locking system 400 including first and second coupling elements 401, 402 is shown, depicting the childproof locking system 400 in a first state. As shown, in the first state, a first fastener 411 of the first coupling element 401 may be mechanically and magnetically engaged with a second fastener 421 of the second coupling element 402. The childproof locking system 400 may be adjusted from the first state to a second state (not shown in FIG. 4, but similar in configuration to the second state shown in FIG. 1B) in which the first fastener 411 may be disengaged from the second fastener 421, though the second fastener 421 may extend at least partially into a first outer shell 410 of the first coupling element 401. The childproof locking system 400 may be adjusted from the second state to a third state (not shown in FIG. 4, but similar in configuration to the third state shown in FIG. 1C) in which the first coupling element 401 may be decoupled from the second coupling element

402, wherein the second fastener 421 may be retracted within a second outer shell 420 of the second coupling element 402. The first and second fasteners 411, 421 may be reversibly engageable with one another such that the childproof locking system 400 may be adjusted from the first state to the second state and vice versa and from the second state to the third state and vice versa, e.g., so as to limit access to an interior of a storage compartment. In some embodiments, the childproof locking system 400 may be assembled and configured similarly to the childproof locking system 100 of FIGS. 1A-1C, the childproof locking system 200 of FIGS. 2A and 2B, and/or the childproof locking system 300 of FIGS. 3A-3C. Accordingly, in certain embodiments, the description provided above with reference to FIGS. 1A-3C may be additionally applied to the embodiment(s) depicted in FIG. 4. Moreover, in certain embodiments, additional components and/or functionalities may be included in the childproof locking system 400 and which may additionally be applied to the various embodiments of FIGS. 1A-3C.

To indicate suitability for substitution in certain non-limiting embodiments, similar reference indicators have been applied to elements in FIG. 4 which may be interchangeable with elements in FIGS. 1A-3C. For example, elements depicted in FIG. 4 may be labeled with the same numbers for the "tens" and "ones" positions as those elements in FIGS. 1A-1C which may be interchangeable in such examples, but may utilize a "4" in the "hundreds" position instead of a "1" (e.g., the first fastener 111 of FIGS. 1A-1C and the first fastener 411 of FIG. 4 may be interchangeable in certain non-limiting embodiments). As such, in certain embodiments, description of any such interchangeable elements described hereinabove with reference to FIGS. 1A-3C may substitute or supplement description provided below with reference to FIG. 4. Alphabetical indicators (e.g., "a" in "426*a*") in FIG. 4 may, in some examples, identify subcomponents included as a part of another component (e.g., "426*a*" may identify a subcomponent of "426").

A set of Cartesian coordinate axes 451 is shown in FIG. 4 for contextualizing positions of the various components of the childproof locking system 400. Specifically, x-, y-, and z-axes are provided which are mutually perpendicular to one another, where the x- and z-axes define a plane of the partially transparent view shown in FIG. 4 and the y-axis is perpendicular thereto. In some embodiments, a direction of gravity may be parallel to and coincident with a negative direction of the z-axis.

In some embodiments, the second coupling element 402 may include a carrier 426 including a cavity 426*a* in which the second fastener 421 may be displaced (e.g., during adjustment of the childproof locking system 400 from the first state to the second state). In certain embodiments, the cavity 426*a* may delimit a rotational path and/or a linear displacement path of the second fastener 421 and may include one or more stops or catches to retain the second fastener 421 within the carrier 426.

In some embodiments, the childproof locking system 400 may not include a key (e.g., configured for mechanical and/or magnetic engagement with the second fastener 421 or the carrier 426). In certain such embodiments, one or both of the first fastener 411 and the carrier 426 (and/or the second fastener 421) may be adapted for handheld use. For example, in some embodiments, the first fastener 411 may include one or more indentations 411*a*, e.g., each shaped to fit one or more fingers so as to provide ease of gripping during handheld use of the first fastener 411. Similarly, in additional or alternative embodiments, the carrier 426 may include one or more indentations 426*b*, e.g., each shaped to fit one or more fingers so as to provide ease of gripping during handheld use of the carrier 426. In an example embodiment, to adjust the childproof locking system 400 from the first state to the third state (e.g., from the first state to the second state and then from the second state to the third state), the first fastener 411 may be maintained in place by exerting pressure upon at least one of the one or more indentations 411*a* and the carrier 426 (and the second fastener 421 housed therein) may be moved, slid, or otherwise displaced (e.g., parallel to the z-axis) by exerting pressure upon at least one of the one or more indentations 426*b*. In an additional or alternative embodiment, and as shown by an arrow 442, to adjust the childproof locking system 400 from the first state to the third state (e.g., from the first state to the second state and then from the second state to the third state), displacement of the second fastener 421 may include (limited) rotation and/or linear displacement away from the first fastener 411 within the cavity 426*a* at least partially due to magnetic engagement of a ferromagnetic material 425 of the second fastener 421 with a carrier ferromagnetic material 427 of the carrier 426.

In some embodiments, the childproof locking system 400 may be used whether oriented as shown in FIG. 4 or rotated 180° about the y-axis. For instance, because the second fastener 421 may rotate and/or be displaced within the cavity 426*a* at least partially due to the magnetic engagement of the ferromagnetic material 425 with the carrier ferromagnetic material 427, reliance on gravity in adjusting between states of the childproof locking system 400 may be reduced relative to certain other embodiments described herein.

Figure 5A:
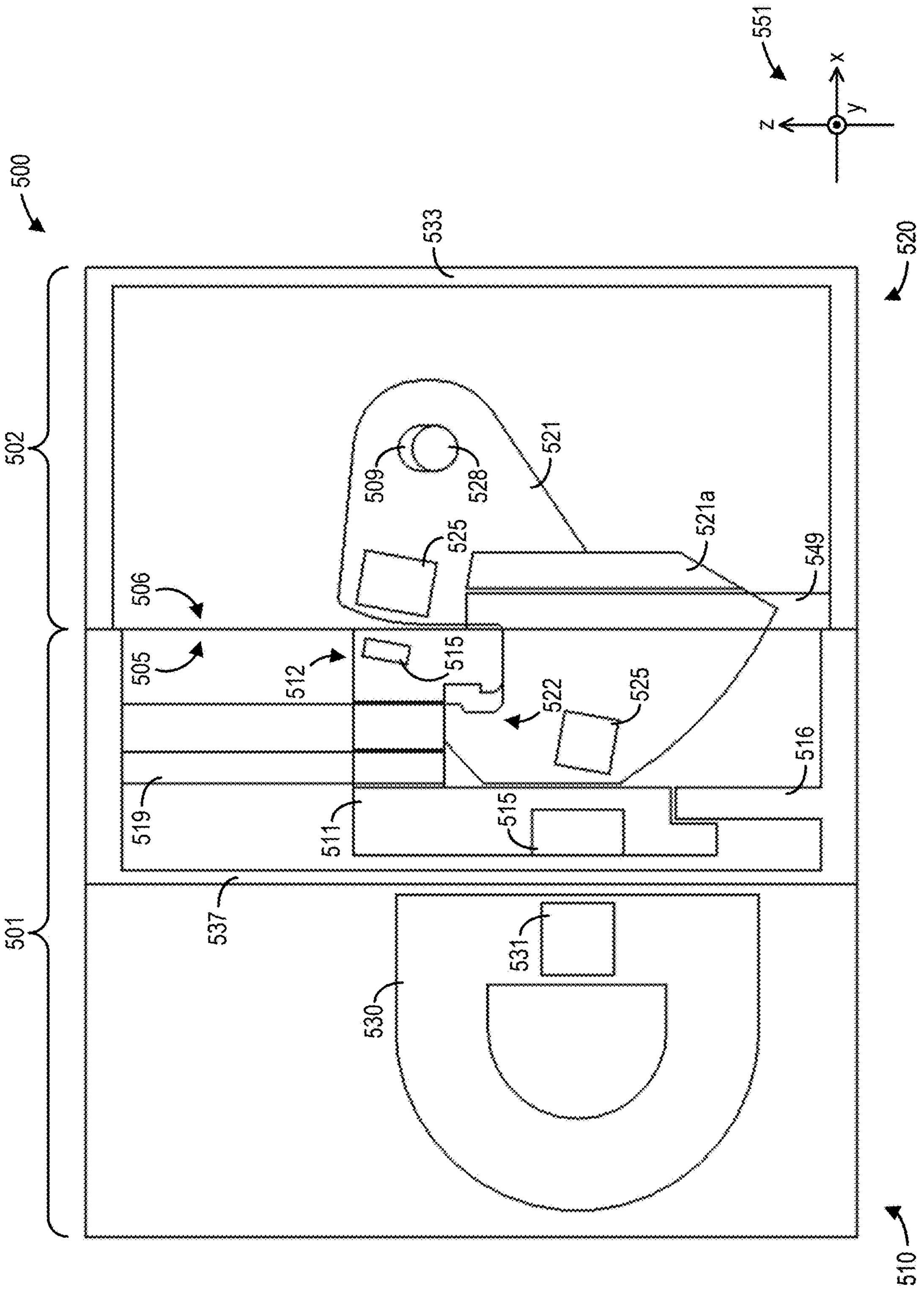
FIG. 5A shows a simplified plan view of a childproof locking system including first and second coupling elements and a key, the childproof locking system being in a first state in which a first fastener of the first coupling element is mechanically and magnetically engaged to a second fastener of the second coupling element, in accordance with at least one embodiment.
Figure 5B:
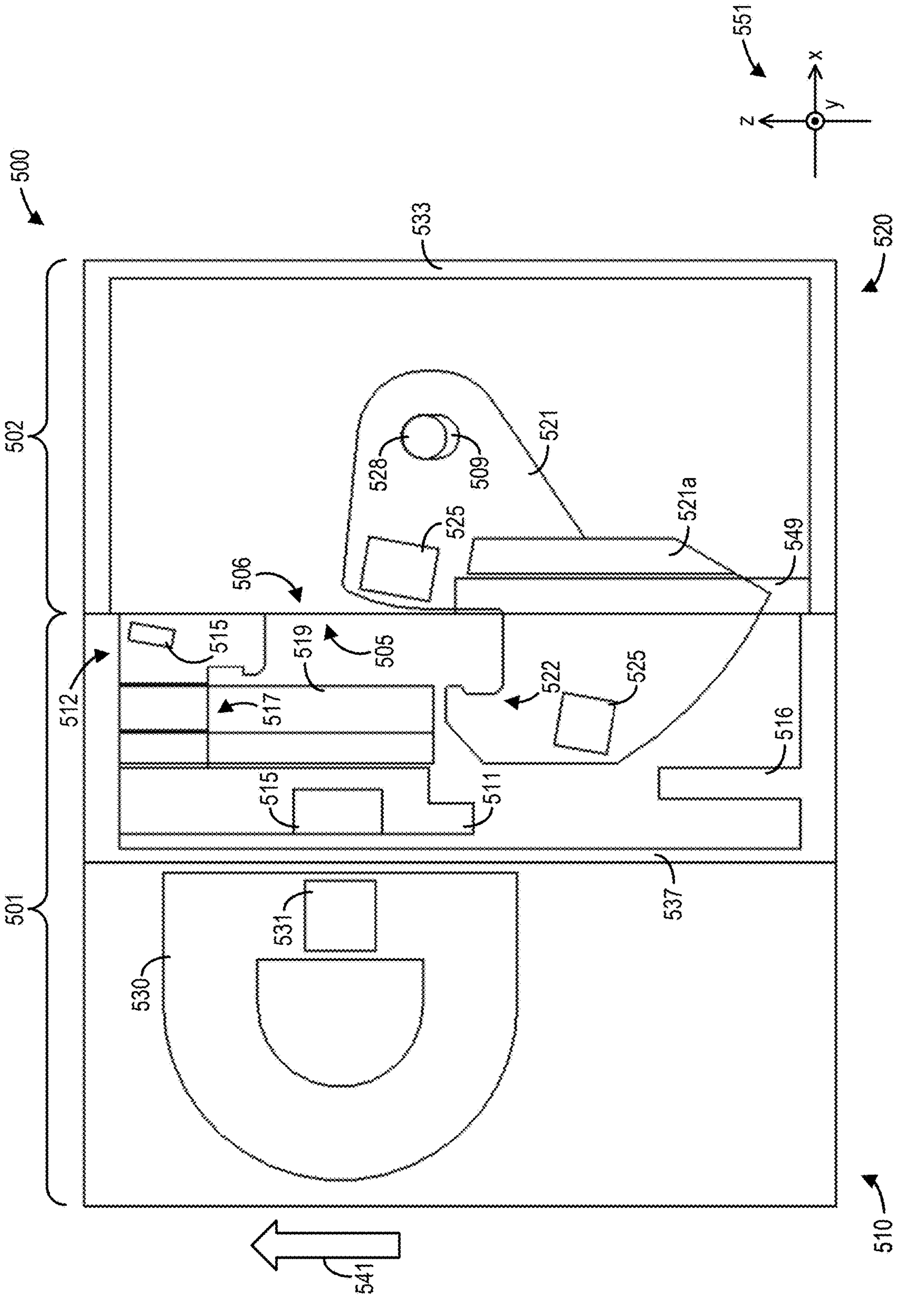
FIG. 5B shows a simplified plan view of the childproof locking system of FIG. 5A in a second state in which the first fastener of the first coupling element is disengaged from the second fastener of the second coupling element, wherein the childproof locking system may be adjusted from the first state to the second state by magnetically engaging the key with the first coupling element and sliding the key, in accordance with at least one embodiment.
Figure 5C:
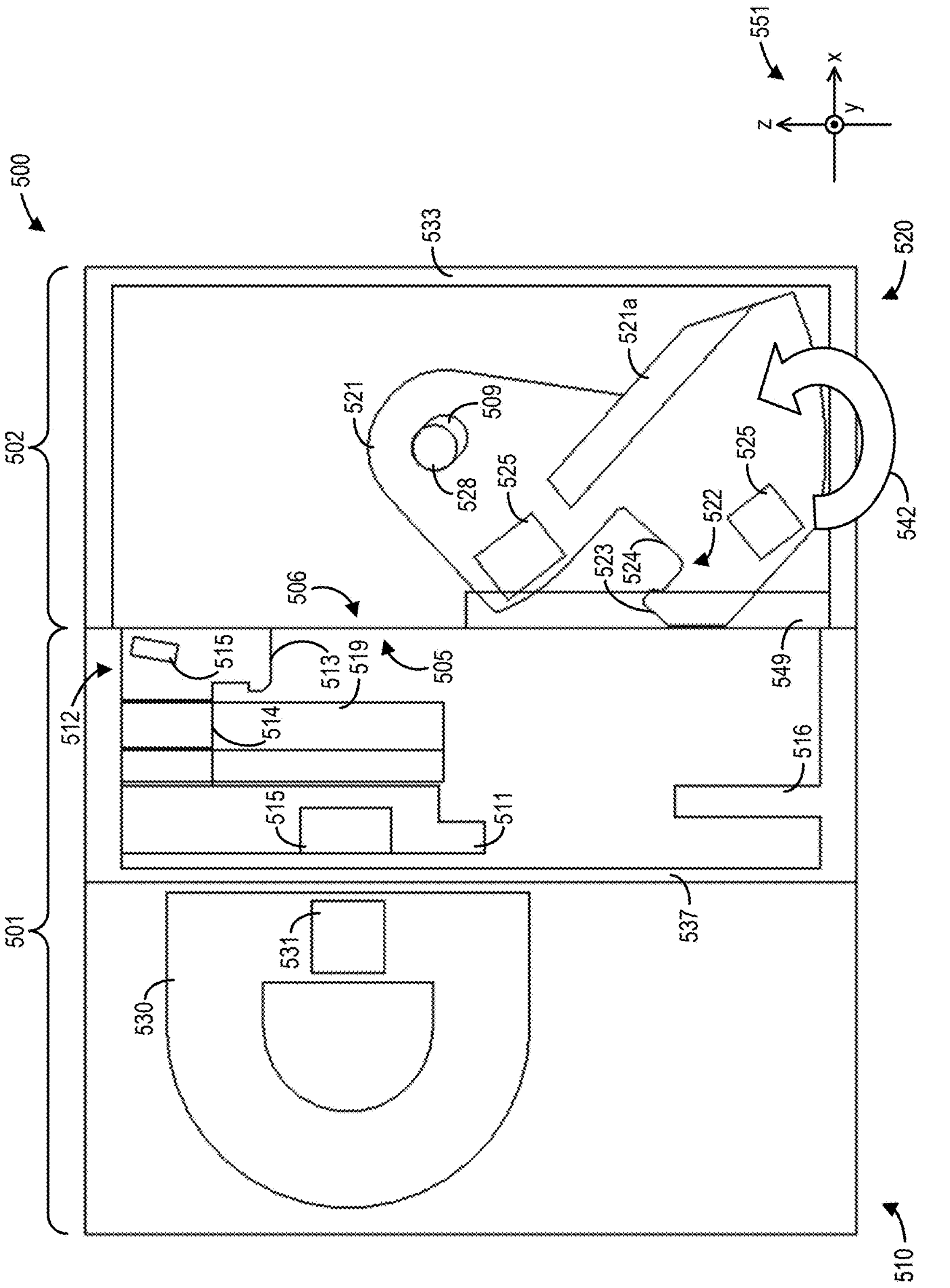
FIG. 5C shows a simplified plan view of the childproof locking system of FIG. 5A in a third state in which the first coupling element is decoupled from the second coupling element, wherein the childproof locking system may be adjusted from the second state to the third state by using gravity to retract the second fastener into an outer shell of the second coupling element, in accordance with at least one embodiment.

Referring now to FIGS. 5A-5C, simplified plan views of a childproof locking system 500 including first and second coupling elements 501, 502 and a key 530 are shown, where FIG. 5A depicts the childproof locking system 500 in a first state, FIG. 5B depicts the childproof locking system 500 in a second state, and FIG. 5C depicts the childproof locking system 500 in a third state. As shown in FIG. 5A, in the first state, a first fastener 511 of the first coupling element 501 may be mechanically and magnetically engaged with a second fastener 521 of the second coupling element 502. As shown in FIG. 5B, in the second state, the first fastener 511 may be disengaged from the second fastener 521. As shown in FIG. 5C, in the third state, the first coupling element 501 may be decoupled from the second coupling element 502. The first and second fasteners 511, 521 may be reversibly engageable with one another such that the childproof locking system 500 may be adjusted from the first state to the second state and vice versa and from the second state to the third state and vice versa, e.g., so as to limit access to an interior of a storage compartment. For example, the childproof locking system 500 may be adjusted: from the first state to the second state by magnetically engaging the key 530 with the first coupling element 501 and sliding the key 530; and from the second state to the third state by using gravity to retract the second fastener 521 into a second outer shell 520 of the second coupling element 502. In some embodiments, the childproof locking system 500 may be assembled and configured similarly to the childproof locking system 100 of FIGS. 1A-1C, the childproof locking system 200 of FIGS. 2A and 2B, the childproof locking system 300 of FIGS. 3A-3C, and/or the childproof locking system 400 of FIG. 4. Accordingly, in certain embodiments, the description provided above with reference to FIGS. 1A-4 may be additionally applied to the embodiment(s) depicted in FIGS. 5A-5C. Moreover, in certain embodiments, additional components and/or functionalities may be included in the childproof locking system 500 and which may additionally be applied to the various embodiments of FIGS. 1A-4.

To indicate suitability for substitution in certain non-limiting embodiments, similar reference indicators have been applied to elements in FIGS. 5A-5C which may be interchangeable with elements in FIGS. 1A-4. For example, elements depicted in FIGS. 5A-5C may be labeled with the same numbers for the "tens" and "ones" positions as those elements in FIGS. 1A-1C which may be interchangeable in such examples, but may utilize a "5" in the "hundreds" position instead of a "1" (e.g., the first fastener 111 of FIGS. 1A-1C and the first fastener 511 of FIGS. 5A-5C may be interchangeable in certain non-limiting embodiments). As such, in certain embodiments, description of any such interchangeable elements described hereinabove with reference to FIGS. 1A-4 may substitute or supplement description provided below with reference to FIGS. 5A-5C. Alphabetical indicators (e.g., "a" in "521*a*") in FIGS. 5A-5C may, in some examples, identify subcomponents included as a part of another component (e.g., "521*a*" may identify a subcomponent of "521").

A set of Cartesian coordinate axes 551 is shown in FIGS. 5A-5C for contextualizing positions of the various components of the childproof locking system 500. Specifically, x-, y-, and z-axes are provided which are mutually perpendicular to one another, where the x- and z-axes define a plane of the simplified plan views shown in FIGS. 5A-5C and the y-axis is perpendicular thereto. In some embodiments, a direction of gravity may be parallel to and coincident with a negative direction of the z-axis.

In some embodiments, a first outer shell 510 of the first coupling element 501 may include a wall 537 at a first end of the first outer shell 510 and an opening 505 at a second end of the first outer shell 510, the first end opposing the second end. In an example embodiment, the wall 537 may delimit at least a portion of a cavity open at the second end (e.g., the opening 505), such that objects may be placed within the cavity without passing through to the first end of the first outer shell 510 (e.g., being obstructed by the wall 537). As shown, in certain embodiments, the wall 537 may be monolithically formed from the first outer shell 510. In other embodiments, the wall 537 may be secured to a body of the first outer shell 510 (e.g., a portion of the first outer shell 510 excepting the wall 537) with a plurality of fasteners (e.g., threaded fasteners, bolts, integrally molded clip fasteners, etc.).

Similarly, in some embodiments, the second outer shell 520 may include a wall 533 at a first end of the second outer shell 520 and an opening 506 at a second end of the second outer shell 520, the first end opposing the second end. In an example embodiment, the wall 533 may delimit at least a portion of a cavity open at the second end (e.g., the opening 506), such that objects may be placed within the cavity without passing through to the first end of the second outer shell 520 (e.g., being obstructed by the wall 533). As shown, in certain embodiments, the wall 533 may be monolithically formed from the second outer shell 520. In other embodiments, the wall 533 may be secured to a body of the second outer shell 520 (e.g., a portion of the second outer shell 520 excepting the wall 533) with a plurality of fasteners (e.g., threaded fasteners, bolts, integrally molded clip fasteners, etc.).

In some embodiments, the first coupling element 501 may include a first track 519 along which the first fastener 511 may be linearly displaced. As shown, in certain embodiments, the first track 519 may not extend an entire length of the first coupling element 501 (e.g., parallel to the z-axis). For example, the first track 519 may be a linear ridge monolithically formed with the first outer shell 510 extending from an upper end of the first outer shell 510 to a position of the first fastener 511 when the childproof locking system 500 is in the first state, such that the first fastener 511 may be mechanically engaged with the first track 519. In other embodiments, the first track 519 may extend the entire length of the first coupling element 501, e.g., from the upper end of the first outer shell 510 to a lower end of the first outer shell 510 opposing the upper end.

In some embodiments, the first coupling element 501 may include a stop 516 against which the first fastener 511 may be brought to rest during certain operations of the childproof locking system 500. As shown, in certain embodiments, the stop 516 may not extend the entire length of the first coupling element 501 (e.g., parallel to the z-axis). For example, the stop 516 may be configured as a wall monolithically formed with the first outer shell 510 extending from the lower end of the first outer shell 510 to the position of the first fastener 511 when the childproof locking system 500 is in the first state, such that the first fastener 511 may abut the stop 516.

In some embodiments, the first fastener 511 may include a pair of first ferromagnetic materials 515, wherein one first ferromagnetic material 515 of the pair of first ferromagnetic materials 515 may be included in a first hook 512 of the first fastener 511 and wherein another first ferromagnetic material 515 of the pair of first ferromagnetic materials 515 may be included in a body of the first fastener 511. In at least one such embodiment, the first ferromagnetic material 515 included in the first hook 512 may be restricted by a relative size of the first hook 512 and thus the first ferromagnetic material 515 included in the body of the first fastener 511 (e.g., having a larger size than the first ferromagnetic material 515 included in the first hook 512) may be provided to increase a magnetic attraction between the first and second fasteners 511, 521 during magnetic engagement thereof. Similarly, in such embodiments, the second fastener 521 may include a pair of second ferromagnetic materials 525, positioned, e.g., in a body of the second fastener 521, so as to respectively magnetically engage with the pair of first ferromagnetic materials 515 when the childproof locking system 500 is in the first state. In certain embodiments, the pairs of first and second ferromagnetic material 515, 525 may be aligned such that any specific region of first and second adhesive layers (not shown in FIGS. 5A-5C) respectively affixing or otherwise adhering the first and second outer shells 510, 520 to first and second surfaces may not be subjected to undue mechanical stress during disengagement of the first and second fasteners 511, 521.

In some embodiments, a gap 517 may be formed by a bend 514 of the first hook 512. In an example embodiment, the gap 517 may be appreciably larger than a tip 523 of a second hook 522 of the second fastener 521 so as to account for the first and second surfaces to which the first and second coupling elements 501, 502 may be affixed or otherwise adhered being separated by a gap of similar size to the gap 517.

In some embodiments, at least one of the pair of first ferromagnetic materials 515 (e.g., the first ferromagnetic material 515 included in the body of the first fastener 511) may be positioned so as to magnetically engage with a third ferromagnetic material 531 of the key 530. In certain embodiments, a magnetic force between the first and third ferromagnetic materials 515, 531 may be sufficient such that the first and third ferromagnetic materials 515, 531 remain magnetically engaged even though the wall 537 may be interposed between the first and third ferromagnetic materials 515, 531. In such embodiments, to adjust the childproof locking system 500 from the first state to the second state, the key 530 may be slid along the wall 537 so as to compel the linear displacement of the first fastener 511 via the magnetic engagement of the first and third ferromagnetic materials 515, 531.

In some embodiments, the first ferromagnetic material 515 included in the body of the first fastener 511 may magnetically engage with the third ferromagnetic material 531 and at least one second ferromagnetic material 525 of the pair of second ferromagnetic materials 525 when the first and second fasteners 511, 521 are magnetically engaged (e.g., when the childproof locking system 500 is in the first state). In certain such embodiments, to overcome the magnetic attraction between the pairs of first and second ferromagnetic materials 515, 525 when adjusting the childproof locking system 500 from the first state to the second state, the third ferromagnetic material 531 may be sized and positioned within the key 530 so as to have a stronger magnetic attraction to the first ferromagnetic material 515 included in the body of the first fastener 511 than the magnetic attraction between the first ferromagnetic material 515 included in the body of the first fastener 511 and the at least one second ferromagnetic material 525.

In some embodiments, the second fastener 521 may include a stop 521*a* which may be brought to rest against a portion of the second outer shell 520 during certain operations of the childproof locking system 500. For example, a stop 549 may be configured as a wall monolithically formed from the second outer shell 520. In an example embodiment, the stop 521*a* may be brought to rest against the stop 549 when the childproof locking system 500 is in the first state. As shown, in certain embodiments, the stop 549 may not extend the entire length of the first coupling element 502 (e.g., parallel to the z-axis).

In some embodiments, the second fastener 521 may include an aperture 509 in which a pin 528 may pass through such that the pin 528 may couple the second fastener 521 to the second outer shell 520. As shown, in certain embodiments, a diameter of the aperture 509 or a width of the aperture 509 in at least one direction may be appreciably larger than a width of the pin 528. Accordingly, in such embodiments, the pin 528 may be clearance fit to the aperture 509. For example, the aperture 509 may include an ellipsoidal cross section (e.g., in a plane defined by the x- and z-axes) and the pin 528 may include a circular cross section (e.g., in the plane defined by the x- and z-axes), wherein the ellipsoidal cross section may have a larger diameter (e.g., along at least one axis of the ellipsoidal cross section) than a diameter of the circular cross section. In certain such embodiments, the second fastener 521 may be permitted greater clearance in mechanically disengaging from the first fastener 511 (e.g., when the childproof locking system 500 is adjusted from the first state to the second state) through limited displacement of the second fastener 521 (e.g., as constrained by relative movement of the pin 528 within the aperture 509). In additional or alternative embodiments, when the first and second fasteners 511, 521 are mechanically and magnetically disengaged, the second fastener 521 may freely hang from the pin 528 (e.g., as compelled by gravity).

Figure 6A:
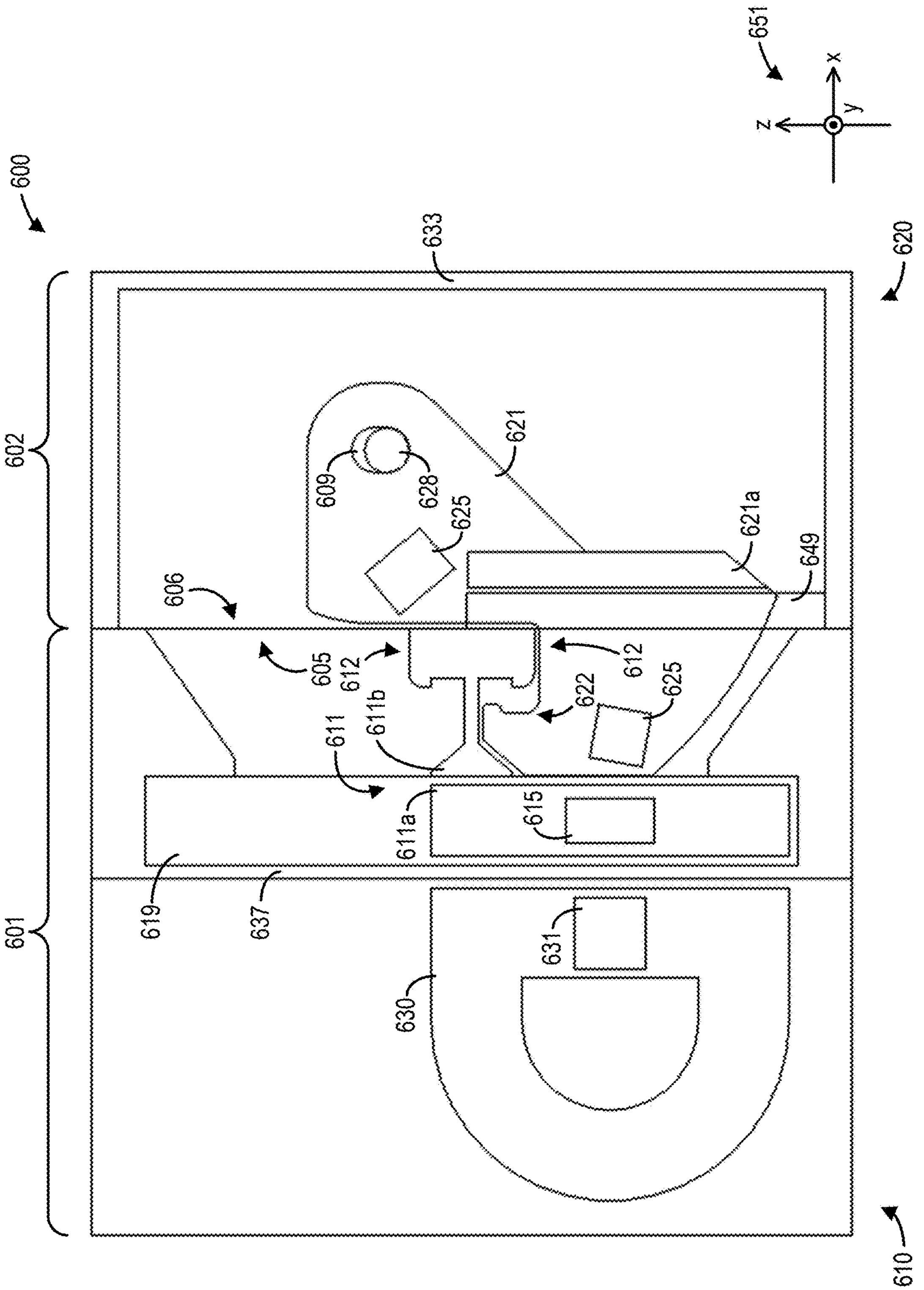
FIG. 6A shows a simplified plan view of a childproof locking system including first and second coupling elements and a key, the childproof locking system being in a first state in which a first magnetic fastener of the first coupling element is magnetically engaged to a second fastener of the second coupling element and a first mechanical fastener of the first coupling element is mechanically engaged to the second fastener, in accordance with at least one embodiment.
Figure 6B:
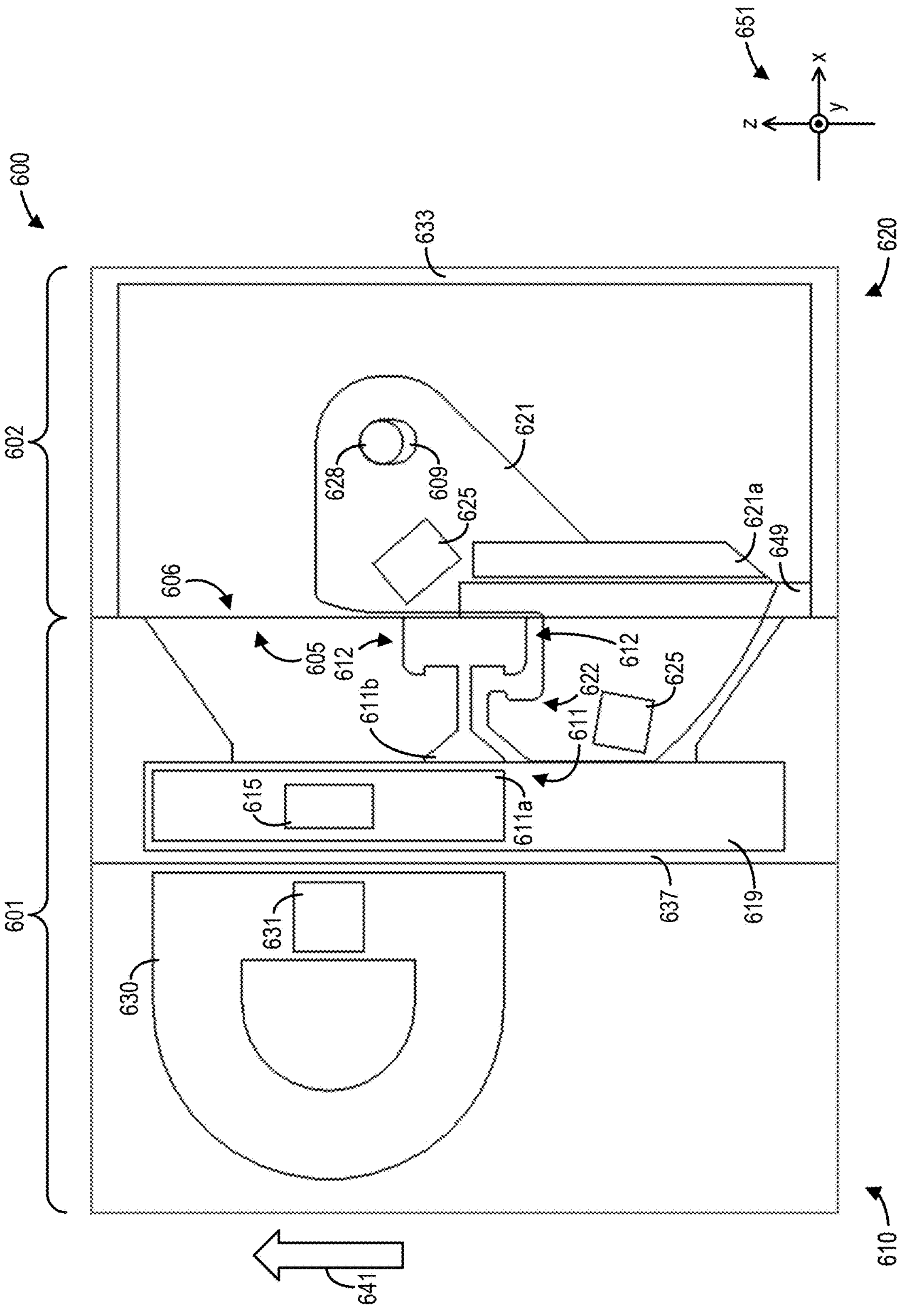
FIG. 6B shows a simplified plan view of the childproof locking system of FIG. 6A in a second state in which each of the first magnetic fastener and the first mechanical fastener of the first coupling element is disengaged from the second fastener of the second coupling element, wherein the childproof locking system may be adjusted from the first state to the second state by magnetically engaging the key with the first coupling element and sliding the key, in accordance with at least one embodiment.
Figure 6C:
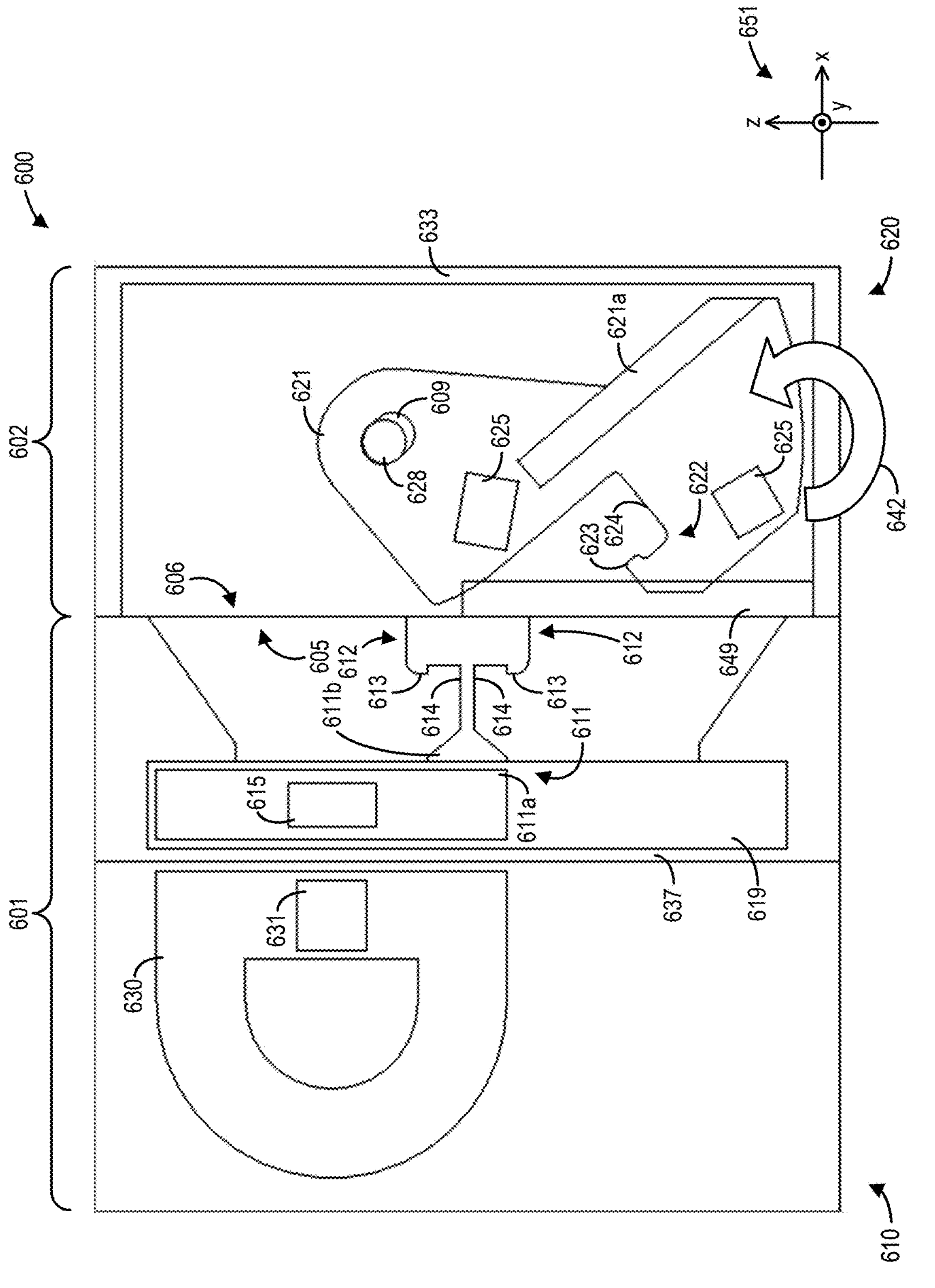
FIG. 6C shows a simplified plan view of the childproof locking system of FIG. 6A in a third state in which the first coupling element is decoupled from the second coupling element, wherein the childproof locking system may be adjusted from the second state to the third state by using gravity to retract the second fastener into an outer shell of the second coupling element, in accordance with at least one embodiment.

Referring now to FIGS. 6A-6C, simplified plan views of a childproof locking system 600 including first and second coupling elements 601, 602 and a key 630 are shown, where FIG. 6A depicts the childproof locking system 600 in a first state, FIG. 6B depicts the childproof locking system 600 in a second state, and FIG. 6C depicts the childproof locking system 600 in a third state. As shown in FIG. 6A, in the first state, a first magnetic fastener 611*a* of the first coupling element 601 may be magnetically engaged with a second fastener 621 of the second coupling element 602 and a first mechanical fastener 611*b* of the first coupling element 601 may be mechanically engaged with the second fastener 621. As shown in FIG. 6B, in the second state, the first magnetic fastener 611*a* may be magnetically disengaged from the second fastener 621 and the first mechanical fastener 611*b* may be mechanically disengaged from the second fastener 621. As shown in FIG. 6C, in the third state, the first coupling element 601 may be decoupled from the second coupling element 602. The first and second fasteners 611, 621 may be reversibly engageable with one another such that the childproof locking system 600 may be adjusted from the first state to the second state and vice versa and from the second state to the third state and vice versa, e.g., so as to limit access to an interior of a storage compartment. For example, the childproof locking system 600 may be adjusted: from the first state to the second state by magnetically engaging the key 630 with the first coupling element 601 and sliding the key 630; and from the second state to the third state by using gravity to retract the second fastener 621 into a second outer shell 620 of the second coupling element 602. In some embodiments, the childproof locking system 600 may be assembled and configured similarly to the childproof locking system 100 of FIGS. 1A-1C, the childproof locking system 200 of FIGS. 2A and 2B, the childproof locking system 300 of FIGS. 3A-3C, the childproof locking system 400 of FIG. 4, and/or the childproof locking system 500 of FIGS. 5A-5C. Accordingly, in certain embodiments, the description provided above with reference to FIGS. 1A-5C may be additionally applied to the embodiment(s) depicted in FIGS. 6A-6C. Moreover, in certain embodiments, additional components and/or functionalities may be included in the childproof locking system 600 and which may additionally be applied to the various embodiments of FIGS. 1A-5C.

To indicate suitability for substitution in certain non-limiting embodiments, similar reference indicators have been applied to elements in FIGS. 6A-6C which may be interchangeable with elements in FIGS. 1A-5C. For example, elements depicted in FIGS. 6A-6C may be labeled with the same numbers for the "tens" and "ones" positions as those elements in FIGS. 1A-1C which may be interchangeable in such examples, but may utilize a "6" in the "hundreds" position instead of a "1" (e.g., the first coupling element 101 of FIGS. 1A-1C and the first coupling element 601 of FIGS. 6A-6C may be interchangeable in certain non-limiting embodiments). As such, in certain embodiments, description of any such interchangeable elements described hereinabove with reference to FIGS. 1A-5C may substitute or supplement description provided below with reference to FIGS. 6A-6C. Alphabetical indicators (e.g., "a" in "621*a*") in FIGS. 6A-6C may, in some examples, identify subcomponents included as a part of another component (e.g., "621*a*" may identify a subcomponent of "621").

A set of Cartesian coordinate axes 651 is shown in FIGS. 6A-6C for contextualizing positions of the various components of the childproof locking system 600. Specifically, x-, y-, and z-axes are provided which are mutually perpendicular to one another, where the x- and z-axes define a plane of the simplified plan views shown in FIGS. 6A-6C and the y-axis is perpendicular thereto. In some embodiments, a direction of gravity may be parallel to and coincident with a negative direction of the z-axis.

In some embodiments, the first fastener 611 may include the first magnetic fastener 611*a* and the first mechanical fastener 611*b*. In such embodiments, the first magnetic fastener 611*a* may not be coupled to the first mechanical fastener 611*b*. For example, the first magnetic fastener 611*a* may be mechanically engaged with a first track 619 of the first coupling element 601, while the first mechanical fastener 611*b* may be monolithically formed from a first outer shell 610 of the first coupling element 601. In certain embodiments, by including separate magnetic and mechanical fasteners (e.g., the first magnetic fastener 611*a* and the first mechanical fastener 611*b*) in the first coupling element 601, greater individual control of magnetic and mechanical locking mechanisms may be provided to an operator of the childproof locking system 600.

In some embodiments, the first coupling element 601 may be installed (e.g., affixed or otherwise adhered to a surface) in a first orientation (e.g., as shown in FIGS. 6A-6C) or the first coupling element 601 may be installed in a second orientation in which the first coupling element 601 has been rotated 180° about the x-axis (e.g., relative to the first orientation shown in FIGS. 6A-6C), where the second fastener 621 may mechanically and magnetically engage with the first fastener 611 regardless of whether the first coupling element 601 is installed in the first orientation or the second orientation. In certain embodiments, the first mechanical fastener 611*b* may include a pair of first hooks 612, wherein one first hook 612 of the pair of first hooks 612 may be mechanically engageable with a second hook 622 of the second fastener 621 when the first coupling element 601 is installed in the first orientation and wherein another first hook 612 of the pair of first hooks 612 may be mechanically engageable with the second hook 622 when the first coupling element 601 is installed in the second orientation. In additional or alternative embodiments, In some embodiments, the first coupling element 601 may be installed in the first orientation or the first coupling element 601 may be installed in a third orientation in which the first coupling element 601 has been rotated 180° about the y-axis (e.g., relative to the first orientation shown in FIGS. 6A-6C), where the second fastener 621 may mechanically and magnetically engage with the first fastener 611 regardless of whether the first coupling element 601 is installed in the first orientation or the third orientation. In additional or alternative embodiments, a first ferromagnetic material 615 included in the first magnetic fastener 611*a* may be magnetically engageable with at least one second ferromagnetic material 625 included in the second fastener 621 regardless of whether the first coupling element 601 is installed in the first orientation, the second orientation, or the third orientation because the first magnetic fastener 611*a* may be repositioned via linear displacement along the first track 619 (e.g., as compelled by gravity).

Figure 7:
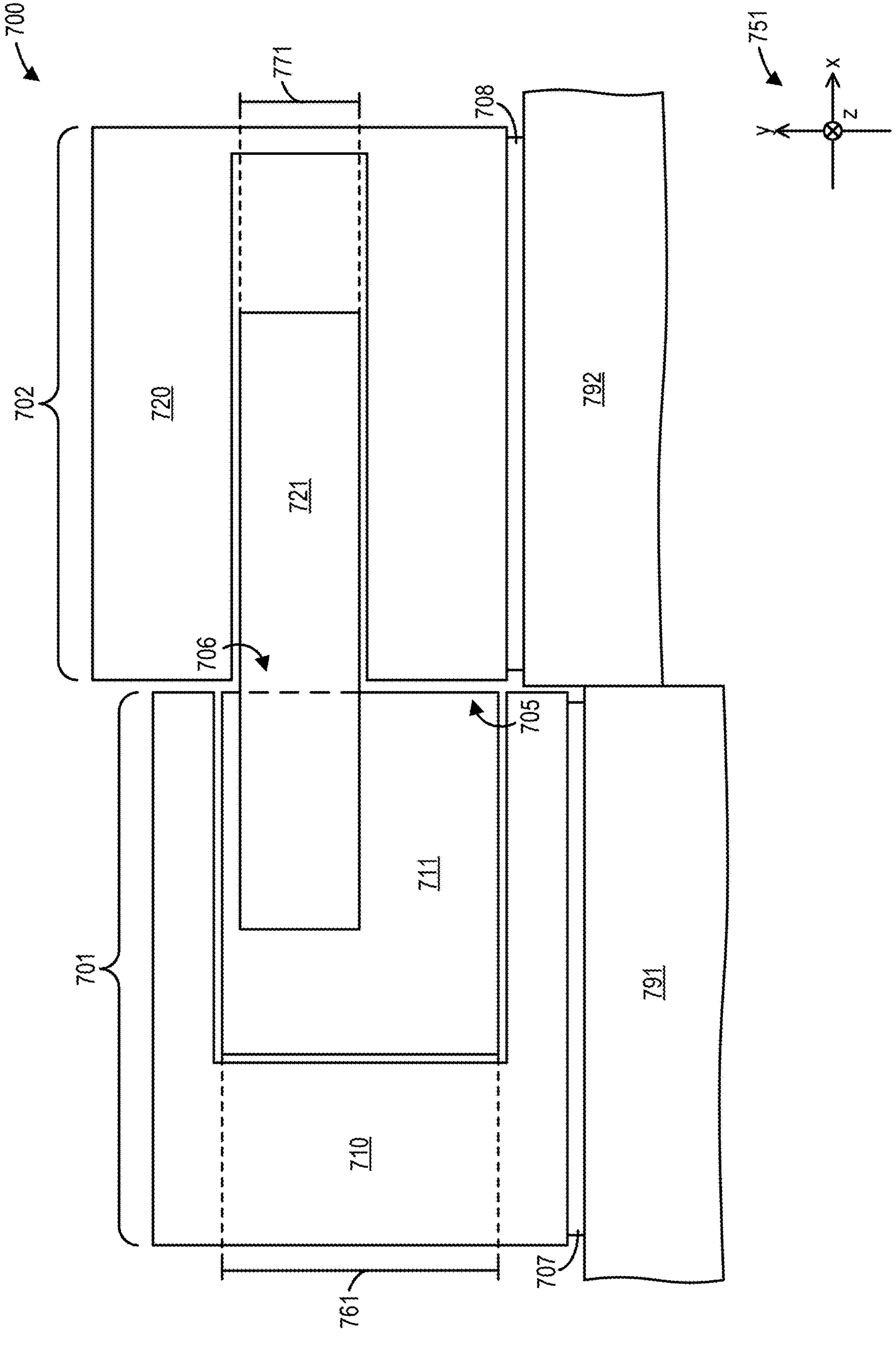
FIG. 7 shows a simplified elevation view of a childproof locking system including first and second coupling elements, wherein the first and second coupling elements may respectively be affixed or otherwise adhered to first and second surfaces, the first and second surfaces not being flush or otherwise aligned with one another, in accordance with at least one embodiment.

Referring now to FIG. 7, a simplified elevation view of a childproof locking system 700 including first and second coupling elements 701, 702 is shown, depicting the childproof locking system 700 in a first state. As shown, in the first state, a first fastener 711 of the first coupling element 701 may be mechanically and magnetically engaged with a second fastener 721 of the second coupling element 702. The childproof locking system 700 may be adjusted from the first state to a second state (not shown in FIG. 7, but similar in configuration to the second state shown in FIG. 1B) in which the first and second fasteners 711 may be disengaged from the second fastener 721, though the second fastener 721 may extend at least partially into a first outer shell 710 of the first coupling element 701. The childproof locking system 700 may be adjusted from the second state to a third state (not shown in FIG. 7, but similar in configuration to the third state shown in FIG. 1C) in which the first coupling element 701 may be decoupled from the second coupling element 702, wherein the second fastener 721 may be retracted within a second outer shell 720 of the second coupling element 702. The first and second fasteners 711, 721 may be reversibly engageable with one another such that the childproof locking system 700 may be adjusted from the first state to the second state and vice versa and from the second state to the third state and vice versa, e.g., so as to limit access to an interior of a storage compartment. As shown, the first and second coupling elements 701, 702 may respectively be affixed or otherwise adhered to first and second surfaces 791, 792 (e.g., of a storage compartment, such as a refrigerated storage compartment storing perishable food), the first and second surfaces 791, 792 not being flush or otherwise aligned with one another. In some embodiments, the childproof locking system 700 may be assembled and configured similarly to the childproof locking system 100 of FIGS. 1A-1C, the childproof locking system 200 of FIGS. 2A and 2B, the childproof locking system 300 of FIGS. 3A-3C, the childproof locking system 400 of FIG. 4, the childproof locking system 500 of FIGS. 5A-5C, and/or the childproof locking system 600 of FIGS. 6A-6C. Accordingly, in certain embodiments, the description provided above with reference to FIGS. 1A-6C may be additionally applied to the embodiment(s) depicted in FIG. 7. Moreover, in certain embodiments, additional components and/or functionalities may be included in the childproof locking system 700 and which may additionally be applied to the various embodiments of FIGS. 1A-6C.

To indicate suitability for substitution in certain non-limiting embodiments, similar reference indicators have been applied to elements in FIG. 7 which may be interchangeable with elements in FIGS. 1A-6C. For example, elements depicted in FIG. 7 may be labeled with the same numbers for the "tens" and "ones" positions as those elements in FIGS. 1A-1C which may be interchangeable in such examples, but may utilize a "7" in the "hundreds" position instead of a "1" (e.g., the first fastener 111 of FIGS. 1A-1C and the first fastener 711 of FIG. 7 may be interchangeable in certain non-limiting embodiments). As such, in certain embodiments, description of any such interchangeable elements described hereinabove with reference to FIGS. 1A-6C may substitute or supplement description provided below with reference to FIG. 7.

A set of Cartesian coordinate axes 751 is shown in FIG. 7 for contextualizing positions of the various components of the childproof locking system 700. Specifically, x-, y-, and z-axes are provided which are mutually perpendicular to one another, where the x- and y-axes define a plane of the simplified elevation view shown in FIG. 7 and the z-axis is perpendicular thereto. In some embodiments, a direction of gravity may be parallel to and coincident with a negative direction of the z-axis.

In some embodiments, the first coupling element 701 may be affixed or otherwise adhered to the first surface 791 via a first adhesive layer 707 and the second coupling element 702 may be affixed or otherwise adhered to the second surface 792 via a second adhesive layer 708. As shown, in certain embodiments, the first and second surfaces 791, 792 may not be flush or otherwise aligned with one another (e.g., with respect to the y-axis). Accordingly, in certain such embodiments, a thickness 771 of the second fastener 721 may be less than a thickness 761 of the first fastener 711. In such embodiments, when the second fastener 721 extends outwardly through an opening 706 of the second outer shell 720 of the second coupling element 702, greater clearance (e.g., with respect to the y-axis) may be provided for the second fastener 721 to enter an opening 705 of the first outer shell 710 of the first coupling element 701 to engage with the first fastener 711. Accordingly, in such embodiments, the childproof locking system 700 may be able to provide security to a greater range of storage compartments, e.g., as long as surfaces of such storage compartments to which the childproof locking system 700 is affixed or otherwise adhered are unaligned by no more than a difference between the thicknesses 761 and 771.

Figure 8:
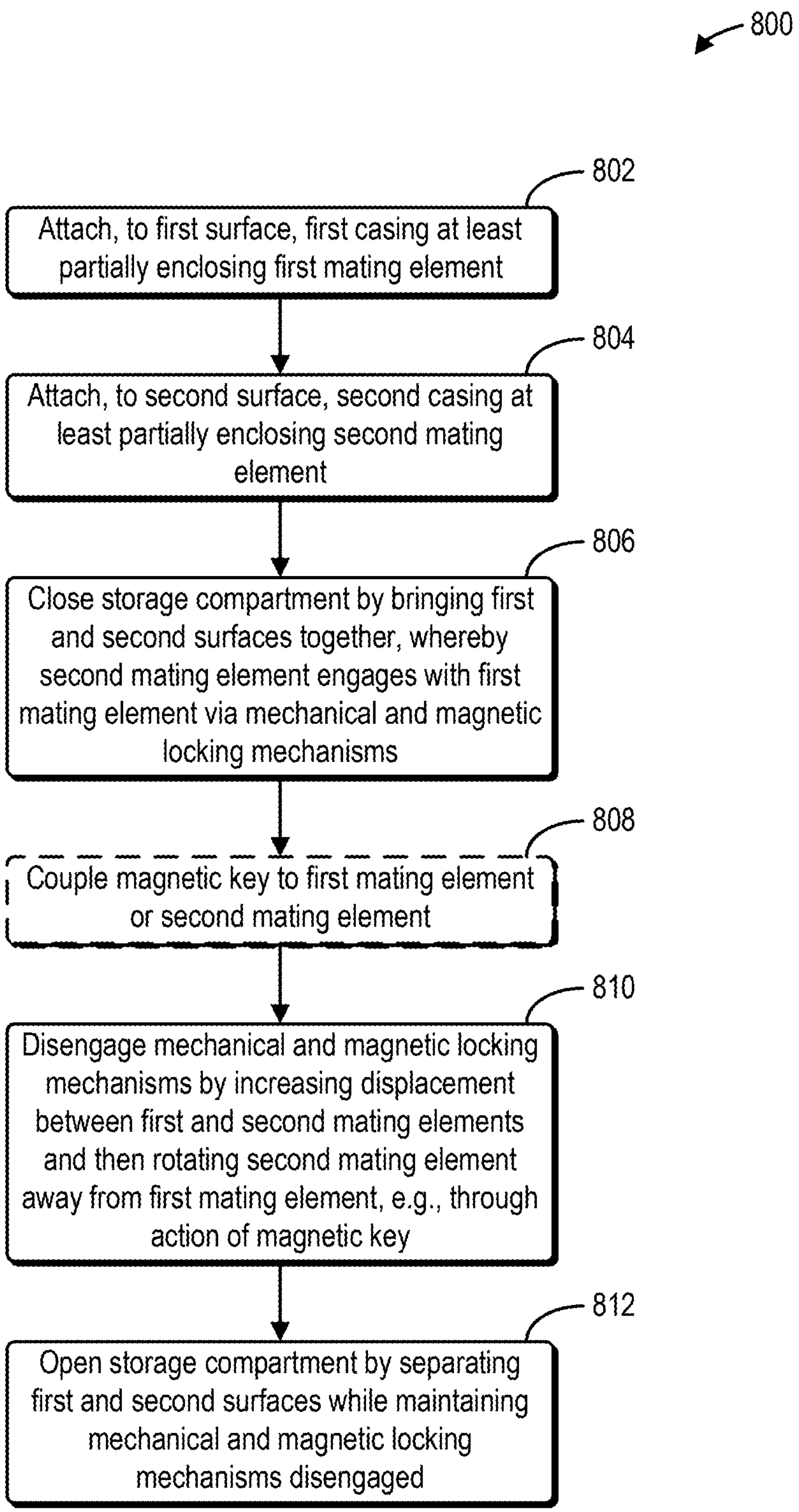
FIG. 8 shows a block diagram of a method for locking a storage compartment by mechanically and magnetically engaging first and second mating elements, such as a pair of fasteners, of a childproof locking system and unlocking the storage compartment by disengaging the first and second mating elements, in accordance with at least one embodiment.

Referring now to FIG. 8, a flowchart of a method 800 for locking and unlocking a storage compartment is shown, wherein the storage compartment is locked by mechanically and magnetically engaging first and second mating elements of a childproof locking system, such as any of the childproof locking systems variously described in detail above with reference to FIGS. 1A-7, and wherein the storage compartment is unlocked by disengaging the first and second mating elements. In an example embodiment, the storage compartment may be a refrigerated storage compartment storing perishable food, such that, by locking the storage compartment with the childproof locking system, access to the perishable food may be restricted (e.g., from users, such as children, who may lack sufficient mental and/or physical capabilities to easily operate the childproof locking system).

Though the method 800 is described below, by way of example, as an ordered sequence of steps, embodiments of methods for locking and unlocking a storage compartment utilizing a childproof locking system are not limited to the below description of the method 800. For instance, in certain embodiments, additional or alternative sequences of steps may be performed, where individual steps discussed with reference to the method 800 may be added, removed, substituted, modified, or interchanged. As an example, block 808 is represented with dashed lines to indicate that coupling of a magnetic key to either the first mating element or the second mating element is optional in some embodiments (e.g., the block 808 may be included in the method 800 in embodiments of the childproof locking system that do include the magnetic key).

At block 802, the method 800 may include attaching (or otherwise coupling), to a first surface (e.g., of the storage compartment), a first casing (e.g., the first outer shell 110 of FIGS. 1A-1C) at least partially enclosing the first mating element (e.g., the first fastener 111 of FIGS. 1A-1C). In an example embodiment, the first surface may be a wall or a door of the storage compartment, or a surface adjacent to the storage compartment. The storage compartment may be, for example, a refrigerated storage compartment storing perishable food. In some embodiments, the first mating element may be engaged with a first track (e.g., the first track 119 of FIGS. 1A-1C) and configured to move along the first track, such that the first mating element may be displaced within the first casing during engagement and/or disengagement of the childproof locking system. In additional or alternative embodiments, the first mating element may be maintained in position within the first casing during engagement and/or disengagement of the childproof locking system.

At block 804, the method 800 may include attaching (or otherwise coupling), to a second surface (e.g., of the storage compartment), a second casing (e.g., the second outer shell 120 of FIGS. 1A-1C) at least partially enclosing the second mating element (e.g., the second fastener 121 of FIGS. 1A-1C). In some embodiments, the second casing may be attached to the second surface so as to be aligned with the first casing (e.g., attached to the first surface). In an example embodiment, if the first surface is the door of the storage compartment, the second surface may be a wall of the storage compartment or a surface adjacent to the storage compartment. In another example embodiment, if the first surface is the wall of the storage compartment or the surface adjacent to the storage compartment, the second surface may be a door of the storage compartment. In some embodiments, the second mating element may be engaged with a second track (e.g., the second track 129 of FIGS. 1A-1C) and configured to move along the second track, such that the second mating element may be displaced within the second casing during engagement and/or disengagement of the childproof locking system. In additional or alternative embodiments, the second mating element may be maintained in position within the second casing during engagement and/or disengagement of the childproof locking system.

At block 806, the method 800 may include closing the storage compartment by bringing the first and second surfaces together, whereby the second mating element may engage with the first mating element via engagement of mechanical and magnetic locking mechanisms. In an example embodiment, engaging the first and second mating elements may adjust the childproof locking system from a disengaged state (e.g., the third state of FIG. 1C) to a engaged state (e.g., the first state of FIG. 1A). In some embodiments, the first and second surfaces may be brought in physical contact with one another. In other embodiments, the first and second surfaces may be brought together close enough such that a human hand cannot access an interior of the storage compartment, though the first and second surfaces may not necessarily be in physical contact with one another. In some embodiments, the second mating element engaging with the first mating element may include the second mating element extending through an opening (e.g., the second opening 106 of FIGS. 1A-1C) of the second casing and into an opening (e.g., the second opening 105 of FIGS. 1A-1C) of the first casing such that the second mating element may be at least partially enclosed by the first casing during engagement of the first and second mating elements.

At the block 808, the method 800 may include coupling the magnetic key (e.g., the key 130 of FIGS. 1A-1C) to either the first mating element or the second mating element.

At block 810, the method 800 may include disengaging the mechanical and magnetic locking mechanisms by increasing displacement between the first and second mating elements and then rotating the second mating element away from the first mating element. In an example embodiment, disengaging the mechanical and magnetic locking mechanisms (and thereby the first and second mating elements) may adjust the childproof locking system from the engaged state to the disengaged state. In some embodiments, increasing the displacement between the first and second mating elements may include moving (or otherwise displacing) either the first mating element along the first track (e.g., while maintaining the second mating element in position within the second casing) or the second mating element along the second track (e.g., while maintaining the first mating element in position within the first casing).

In some embodiments, disengaging the magnetic locking mechanism may include applying a force to either the first mating element or the second mating element that overcomes a magnetic attraction between the first and second mating elements. In embodiments wherein the magnetic key is coupled to the first mating element (e.g., at the block 808), the first mating element may be moved along the first track through action of the magnetic key. In certain such embodiments, access is obstructed to the first mating element during engagement of the first and second mating elements (e.g., by the first casing, which may include a wall, such as the wall 237 of FIGS. 2A and 2B, to obstruct access to the first mating element) such that the force that overcomes the magnetic attraction between the first and second mating elements may not be applied without coupling the magnetic key to the first mating element (e.g., at the block 808). Similarly, in embodiments wherein the magnetic key is coupled to the second mating element (e.g., at the block 808), the second mating element may be moved along the second track through action of the magnetic key. In certain such embodiments, access is obstructed to the second mating element during engagement of the first and second mating elements (e.g., by the second casing, which may include a wall, such as the wall 233 of FIGS. 2A and 2B, to obstruct access to the second mating element) such that the force that overcomes the magnetic attraction between the first and second mating elements may not be applied without coupling the magnetic key to the second mating element (e.g., at the block 808).

At block 812, the method 800 may include opening the storage compartment by separating the first and second surfaces while maintaining the mechanical and magnetic locking mechanisms disengaged, e.g., such that the first and second surfaces may no longer be in physical contact with one another. In some embodiments, each of the mechanical and magnetic locking mechanisms may be maintained disengaged by maintaining respective positions of the first and second mating elements after increasing the displacement between the first and second mating elements and then rotating the second mating element away from the first mating element (e.g., at the block 810).

The specification and drawings are to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. For example, operations of processes described herein can be performed in any suitable order unless otherwise indicated herein or otherwise clearly contradicted by context. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

The invention claimed is:

1. An apparatus, comprising:

a first locking element comprising a first ferromagnetic material;

a second locking element reversibly mechanically engageable with the first locking element, the second locking element comprising a second ferromagnetic material;

a first enclosure housing the first locking element;

a second enclosure housing the second locking element, the second locking element movable within the second enclosure; and a carrier configured to be displaceable in the second enclosure, the carrier housing the second locking element within the second enclosure, and the carrier further configured so as to permit limited movement of the second locking element within the carrier when the first and second locking elements are disengaged, wherein, to mechanically engage the first and second locking elements, the second ferromagnetic material is compelled by a magnetic force to extend the second locking element outwardly from an opening of the second enclosure and into an opening of the first enclosure to engage with the first locking element, and wherein, following mechanical disengagement of the first and second locking elements, the second locking element is movable so as to be retracted within the second enclosure and rotated away from the first locking element.

2. The apparatus of claim 1, wherein:

the first locking element comprises a first hook;

the second locking element comprises a second hook; and upon mechanical engagement of the first and second locking elements, a tip of the first hook is to be seated in a bend of the second hook and a tip of the second hook is to be seated in a bend of the first hook.

3. The apparatus of claim 1, wherein:

the magnetic force is induced by attraction of the second ferromagnetic material to the first ferromagnetic material.

4. The apparatus of claim 1, wherein:

the second enclosure houses a third ferromagnetic material; and the second locking element is movable so as to be rotated away from the first locking element upon attraction of the second ferromagnetic material to the third ferromagnetic material.

5. The apparatus of claim 1, further comprising a key comprising a third ferromagnetic material, wherein, upon sliding the key against a side of the second enclosure such that the third ferromagnetic material maintains attraction with the second ferromagnetic material, the first and second locking elements are to become disengaged.

6. The apparatus of claim 1, wherein the carrier is further configured to cause the mechanical disengagement of the first and second locking elements by moving the second locking element within the second enclosure.

7. The apparatus of claim 1, further comprising a pin that couples the carrier to the second enclosure, the pin permitting limited rotation of the carrier within the second enclosure.

8. The apparatus of claim 1, wherein the carrier is formed at least partially around the second locking element, such that the second locking element is not removable from the carrier during operation of the apparatus.

9. The apparatus of claim 1, wherein:

the first enclosure is configured such that limited movement of the first locking element is permitted within the first enclosure; and during disengagement of the first and second locking elements, the first locking element is maintained in position within the first enclosure.

10. A system for limiting access to an interior of a storage compartment, the system comprising:

a first coupling element comprising a first outer shell and a first fastener housed within the first outer shell; and a second coupling element comprising a second outer shell, a second fastener housed within the second outer shell, and an actuator configured to be displaceable in the second outer shell, the actuator carrying the second fastener within the second outer shell, wherein the system is to be adjusted from a second state to a first state upon mechanically and magnetically engaging the first and second fasteners, wherein the system is to be adjusted from the first state to the second state upon overcoming mechanical and magnetic engagement of the first and second fasteners by displacing either the first fastener or the second fastener and thereafter rotating the second fastener away from the first fastener, and wherein relative motion of the second fastener is permitted within the actuator during adjustment from the first state to the second state.

11. The system of claim 10, wherein:

upon affixing one of the first outer shell or the second outer shell to a fixed surface of the storage compartment, affixing another one of the first outer shell or the second outer shell to a door of the storage compartment, and adjusting the system from the second state to the first state, the interior of the storage compartment is not accessible; and upon affixing the one of the first outer shell or the second outer shell to the fixed surface of the storage compartment, affixing the another one of the first outer shell or the second outer shell to the door of the storage compartment, and adjusting the system from the first state to the second state, the interior of the storage compartment is accessible.

12. The system of claim 10, wherein:

the first coupling element comprises a first adhesive strip layered onto the first outer shell, the first adhesive strip including adhesive to affix the first coupling element to the storage compartment; and the second coupling element comprises a second adhesive strip layered onto the second outer shell, the second adhesive strip including adhesive to affix the second coupling element to the storage compartment.

13. The system of claim 10, wherein the first and second outer shells prevent access to the first and second fasteners when the system is in the first state.

14. The system of claim 10, wherein:

the second fastener is to be displaced and thereafter rotated away from the first fastener by displacing the actuator.

15. A method for locking and unlocking a storage compartment, the method comprising:

attaching, to a first surface, a first casing at least partially enclosing a first mating element;

attaching, to a second surface, a second casing at least partially enclosing a second mating element displaceable via a carrier housed within the second casing, the second casing attached to the second surface so as to be aligned with the first casing;

closing the storage compartment by bringing the first and second surfaces together, whereby the second mating element engages with the first mating element via each of a mechanical locking mechanism and a magnetic locking mechanism;

disengaging each of the mechanical and magnetic locking mechanisms by increasing a displacement, via the carrier, between the first and second mating elements and thereafter rotating the second mating element away from the first mating element, wherein relative motion of the second mating element is permitted within the carrier during the disengagement; and while maintaining each of the mechanical and magnetic locking mechanisms disengaged, opening the storage compartment by separating the first and second surfaces.

16. The method of claim 15, wherein each of the mechanical and magnetic locking mechanisms is to be maintained disengaged by maintaining respective positions of the first and second mating elements after increasing the displacement between the first and second mating elements and rotating the second mating element away from the first mating element.

17. The method of claim 15, wherein disengaging the magnetic locking mechanism comprises applying a force, to either the first mating element or the second mating element, that overcomes a magnetic attraction between the first and second mating elements.

18. The method of claim 17, further comprising coupling a magnetic key, to the either the first mating element or the second mating element, via a second magnetic attraction, wherein access is obstructed to the first and second mating elements during engagement of the first and second mating elements such that the force that overcomes the magnetic attraction between the first and second mating elements cannot be applied without coupling the magnetic key to the either the first mating element or the second mating element.

19. The method of claim 15, wherein the second mating element engaging with the first mating element comprises the second mating element extending through an opening of the second casing and into an opening of the first casing such that the second mating element is at least partially enclosed by the first casing during engagement of the first and second mating elements.

20. The method of claim 15, wherein:

the storage compartment is a refrigerated storage compartment storing perishable food;

the first surface is a door of the refrigerated storage compartment; and the second surface is another door of the refrigerated storage compartment or a fixed surface of the refrigerated storage compartment.

* * * * *